(12) United States Patent
Philbrick et al.

(10) Patent No.: US 10,346,923 B2
(45) Date of Patent: Jul. 9, 2019

(54) SYSTEMS AND METHODS FOR PROACTIVE WEATHER PREPAREDNESS

(71) Applicant: The Travelers Indemnity Company, Hartford, CT (US)

(72) Inventors: William S. Philbrick, Wethersfield, CT (US); William Klein, Denver, CO (US); Caston S. Brown, South Windsor, CT (US); Michael J. Hurley, West Hartford, CT (US)

(73) Assignee: The Travelers Indemnity Company, Hartford, CT (US)

( * ) Notice: Subject to any disclaimer, the term of this patent is extended or adjusted under 35 U.S.C. 154(b) by 192 days.

(21) Appl. No.: 14/710,717

(22) Filed: May 13, 2015

(65) Prior Publication Data

US 2016/0335725 A1 Nov. 17, 2016

(51) Int. Cl.
*G06Q 40/08* (2012.01)

(52) U.S. Cl.
CPC .................................. *G06Q 40/08* (2013.01)

(58) Field of Classification Search
CPC ....................................................... G06Q 40/08
USPC ............................................................. 705/4
See application file for complete search history.

(56) References Cited

U.S. PATENT DOCUMENTS

| | | | |
|---|---|---|---|
| 8,890,680 B2 | 11/2014 | Reeser | |
| 8,935,036 B1 * | 1/2015 | Christensen | ........... G06Q 40/08 701/29.1 |
| 8,981,930 B2 | 3/2015 | Horstemeyer | |
| 9,344,330 B2 | 5/2016 | Jacob et al. | |
| 9,424,736 B2 | 8/2016 | Boss et al. | |
| 9,529,401 B2 | 12/2016 | Jordan, II | |
| 2014/0111341 A1 | 4/2014 | Jordan, II | |
| 2014/0114491 A1 | 4/2014 | Jordan, II | |
| 2015/0180708 A1 | 6/2015 | Jacob et al. | |
| 2016/0071398 A1 | 3/2016 | Boss et al. | |

* cited by examiner

*Primary Examiner* — Edward Chang
(74) *Attorney, Agent, or Firm* — Fincham Downs LLC; Carson C. K. Fincham

(57) ABSTRACT

Systems, apparatus, interfaces, methods, and articles of manufacture that provide for proactive weather awareness and actions.

14 Claims, 13 Drawing Sheets

340

344a

| CUSTOMER ID 344a-1 | STREET ADDRESS 344a-2 | CITY 344a-3 | STATE 344a-4 | ZIP 344a-5 | LOCATION ID 344a-6 | LOCATION TYPE 344a-7 |
|---|---|---|---|---|---|---|
| 1234-5678 | 123 Main St. | SEVERN | MD | 21045 | JKAS71 | HOME |
| AS83HR7 | 234 Broad St. | HARTFORD | CT | 06834 | 76ASGS | WORK |
| CHRIS3482 | 345 Elm Blvd. | BALTIMORE | MD | 21045 | LKS8F6 | CURRENT |

344b

| WEATHER ALERT ID 344b-1 | WEATHER ALERT TYPE 344b-2 | SEVERITY 344b-3 | LOCATION ID 344b-4 |
|---|---|---|---|
| NWS-99387 | T-STORM | 7 | JKAS71 |
| NWS-99389 | HAIL | AA | QWD6F |
| WFSB-9K98 | FLOOD | 65 | 8967S5SS |

344c

| WEATHER TIP ID 344c-1 | ALERT TRIGGER 344c-2 | WEATHER TIP 344c-3 |
|---|---|---|
| 00283 | TORNADO | MOVE INDOORS |
| 00284 | T-STORM | SHUT WINDOWS |
| 10028 | FLOOD | REMOVE BOAT FROM WATER |

344d

| LOCATION ID 344d-1 | CUSTOMER ID 344d-2 | LOCATION TYPE 344d-3 | COORDINATES 344d-4 |
|---|---|---|---|
| JKAS71 | 1234-5678 | RESIDENCE | 39.04, -76.57 |
| 8967S5SS | 1234-5678 | BOAT | 38.06, -76.34 |
| 5FSA44D | 1234-5678 | CAR | Rt. 50, mile 75 |
| QWD6F | 1234-5678 | DESTINATION | 363601, 456793 |

344e

| INSURANCE ID 344e-1 | CUSTOMER ID 344e-2 | LOCATION ID 344e-3 | INSURANCE TYPE 344e-4 | INSURED OBJECT 344e-5 | OBJECT STATUS 344e-6 |
|---|---|---|---|---|---|
| 01927455 | 1234-5678 | JKAS71 | HOME OWNERS | HOUSE | WINDOW OPEN |
| 62527455 | 1234-5678 | 8967S5SS | MARINE | BOAT | IN WATER |
| 99127455 | 1234-5678 | 5FSA44D | AUTO | CAR | STREET TIRES |
| TRAV-0934 | CHRIS3482 | 78654SS | WORKERS | PERSON | AT WORK |

*FIG. 3*

SYSTEMS AND METHODS FOR PROACTIVE WEATHER PREPAREDNESS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Weather alerts, such as those provided by the National Weather Service (NWS) of the United States National Oceanic and Atmospheric Administration (NOAA), are useful tools in assisting citizens with weather awareness. Typically, however, such alerts must be specifically sought out by an individual (e.g., by navigating to a particular web page) or require specialized equipment to receive (e.g., a radio receiver capable of acquiring one or more of the Very High Frequency (VHF) radio signals transmitted by the NOAA Weather Radio (NWR) service. Further, as such alerts must necessarily be broadcast in nature to reach as many people as possible, their content must inherently be generalized to be applicable to the large populations to which they are broadcast.

BRIEF DESCRIPTION OF THE DRAWINGS

An understanding of embodiments described herein and many of the attendant advantages thereof may be readily obtained by reference to the following detailed description when considered with the accompanying drawings, wherein:

FIG. 3 is a block diagram of an example data storage structure according to some embodiments;

DETAILED DESCRIPTION

Embodiments described herein are descriptive of systems, apparatus, methods, interfaces, and articles of manufacture for proactive weather preparedness. An enhancement to typical weather alerts, for example, may provide customized weather preparedness tips and/or advice to customer and/or subscribers. In some embodiments, multiple locations associated with a customer, subscriber, and/or other user may be monitored for weather alerts and the user may be provided with weather advice specific to those locations. According to some embodiments, attributes and/or characteristics specific to a location may be utilized to provide targeted weather preparedness advice and/or to identify and/or recommend specific weather-related actions that should be taken (e.g., in preparation for an imminent or likely weather event). Data stored with respect to one or more insurance policies covering a particular object and/or location, for example, may be utilized to determine specific preparedness actions that should be taken with respect to the location and/or object. In some embodiments, assistance in achieving the specific weather preparedness action may be provided and/or effectuated. According to some embodiments, data captured from a mobile device of a user that is descriptive of how and/or when a preparedness action was taken may be utilized to assess insurance claims and/or to provide insurance discounts and/or rewards.

Figure 1:
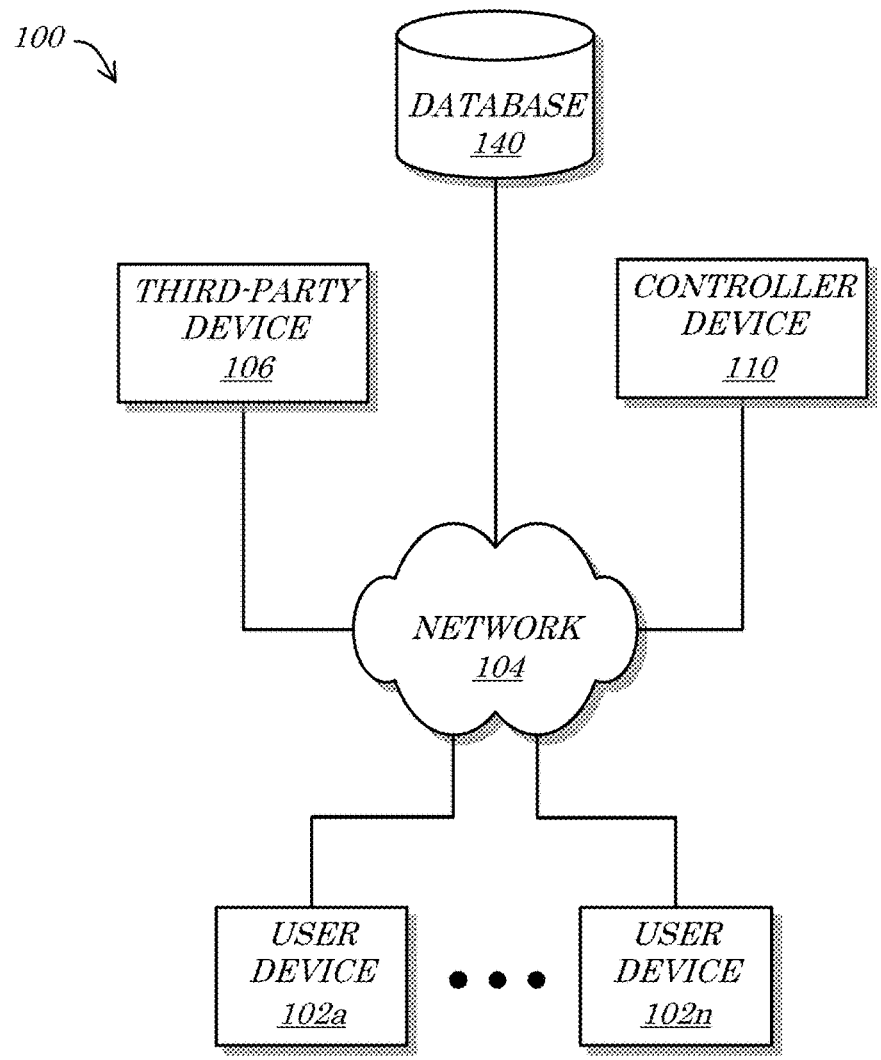
FIG. 1 is a block diagram of a system according to some embodiments.

Referring first to FIG. 1, a block diagram of a system 100 according to some embodiments is shown. In some embodiments, the system 100 may comprise a plurality of user devices 102a-n, a network 104, a third-party device 106, a controller device 110, and/or a database 140. As depicted in FIG. 1, any or all of the devices 102a-n, 106, 110, 140 (or any combinations thereof) may be in communication via the network 104. In some embodiments, the system 100 may be utilized to provide customized weather alerts for a plurality of user locations, identify and/or provide specific weather preparedness actions, and/or facilitate undertaking of the specific weather preparedness actions. The controller device 110 may, for example, interface with one or more of the user devices 102a-n and/or the third-party device 106 to provide customized weather alerts, tips, and/or preparedness actions to users in an effort to reduce weather-related losses (such as with respect to insurance policies of the users).

Fewer or more components 102a-n, 104, 106, 110, 140 and/or various configurations of the depicted components 102a-n, 104, 106, 110, 140 may be included in the system 100 without deviating from the scope of embodiments described herein. In some embodiments, the components 102a-n, 104, 106, 110, 140 may be similar in configuration and/or functionality to similarly named and/or numbered components as described herein. In some embodiments, the system 100 (and/or portion thereof) may comprise a risk assessment and/or underwriting or sales program, system, and/or platform programmed and/or otherwise configured to execute, conduct, and/or facilitate the method 400 of FIG. 4 herein, and/or portions thereof.

The user devices 102a-n, in some embodiments, may comprise any types or configurations of computing, mobile electronic, network, user, and/or communication devices that are or become known or practicable. The user devices 102a-n may, for example, comprise one or more Personal Computer (PC) devices, computer workstations (e.g., claim adjuster and/or handler and/or underwriter workstations), tablet computers such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, the user devices 102a-n may comprise devices owned and/or operated by one or more users such as underwriting product customers (or potential customers, e.g., consumers), customized weather alert subscribers, weather preparedness facilitators, and/or other users. According to some embodiments, the user devices 102a-n may communicate with the controller device 110 via the network 104, such as to receive customized weather alerts and/or instructions regarding customized weather preparedness tips and/or actions, as described herein.

In some embodiments, the user devices 102a-n may interface with the controller device 110 to effectuate communications (direct or indirect) with one or more other user devices 102a-n (such communication not explicitly shown in FIG. 1), such as may be operated by other users. In some embodiments, the user devices 102a-n may interface with the controller device 110 to effectuate communications (direct or indirect) with the third-party device 106 (such communication also not explicitly shown in FIG. 1). In some embodiments, the user devices 102a-n and/or the third-party device 106 may comprise one or more sensors configured and/or couple to sense, measure, calculate, and/or otherwise process or determine weather data and/or weather preparedness data. In some embodiments, such sensor data may be provided to the controller device 110, such as to influence customization of weather alerts and/or advice, conduct claim handling, pricing, risk assessment, line and/or limit setting, quoting, and/or selling or re-selling of an underwriting product (e.g., utilizing evidence of weather preparedness actions taken to influence insurance pricing/payments as described herein).

The network 104 may, according to some embodiments, comprise a Local Area Network (LAN; wireless and/or wired), cellular telephone, Bluetooth®, Near Field Communication (NFC), and/or Radio Frequency (RF) network with communication links between the controller device 110, the user devices 102a-n, the third-party device 106, and/or the database 140. In some embodiments, the network 104 may comprise direct communications links between any or all of the components 102a-n, 106, 110, 140 of the system 100. The user devices 102a-n may, for example, be directly interfaced or connected to one or more of the controller device 110 and/or the third-party device 106 via one or more wires, cables, wireless links, and/or other network components, such network components (e.g., communication links) comprising portions of the network 104. In some embodiments, the network 104 may comprise one or many other links or network components other than those depicted in FIG. 1. The user devices 102a-n may, for example, be connected to the controller device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 106, 110, 140 of the system 100. The network 104 may comprise one or more cellular telephone networks with communication links between the user devices 102a-n and the controller device 110, for example, and/or may comprise the Internet, with communication links between the controller device 110 and the third-party device 106 and/or the database 140, for example.

The third-party device 106, in some embodiments, may comprise any type or configuration of a computerized processing device such as a PC, laptop computer, computer server, database system, and/or other electronic device, devices, or any combination thereof. In some embodiments, the third-party device 106 may be owned and/or operated by a third-party (i.e., an entity different than any entity owning and/or operating either the user devices 102a-n or the controller device 110). The third-party device 106 may, for example, be owned and/or operated by NOAA, a private weather data provider, a third-party automation controller and/or service, or one or more weather preparedness service providers (e.g., laborers, handy-men, carpenters, builders, technicians, drivers and/or haulers, riggers, loaders, storage and/or shipping service providers, mechanics, etc.). In some embodiments, the third-party device 106 may supply and/or provide data such as weather data to the controller device 110 and/or the user devices 102a-n. In some embodiments, the third-party device 106 may comprise a plurality of devices and/or may be associated with a plurality of third-party entities.

In some embodiments, the controller device 110 may comprise an electronic and/or computerized controller device such as a computer server communicatively coupled to interface with the user devices 102a-n and/or the third-party device 106 (directly and/or indirectly). The controller device 110 may, for example, comprise one or more PowerEdge™ M910 blade servers manufactured by Dell®, Inc. of Round Rock, Tex. which may include one or more Eight-Core Intel® Xeon® 7500 Series electronic processing devices. According to some embodiments, the controller device 110 may be located remote from one or more of the user devices 102a-n and/or the third-party device 106. The controller device 110 may also or alternatively comprise a plurality of electronic processing devices located at one or more various sites and/or locations.

According to some embodiments, the controller device 110 may store and/or execute specially programmed instructions to operate in accordance with embodiments described herein. The controller device 110 may, for example, execute one or more programs that facilitate the provision of customized weather alerts, tips, advice, and/or actions, and/or that may facilitate undertaking of any identified actions and/or may verify that such actions have been taken (which, in some embodiments, may cause a change in insurance parameters). According to some embodiments, the controller device 110 may comprise a computerized processing device such as a PC, laptop computer, computer server, and/or other electronic device to manage and/or facilitate transactions and/or communications regarding the user devices 102a-n. An insurance company employee, agent, claim handler, underwriter, and/or other user (e.g., customer, consumer, client, or company) may, for example, utilize the controller device 110 to (i) price and/or underwrite one or more products, such as insurance, indemnity, and/or surety products (e.g., based on weather preparedness actions taken by an insured or agent thereof), (ii) determine, provide, and/or be provided with weather and/or weather alert information, (iii) determine, provide, and/or be provided with weather preparedness action information, (iv) provide an interface via which an underwriting entity may manage and/or facilitate underwriting of various products (e.g., based on weather preparedness actions taken by an insured and/or agent thereof, in accordance with embodiments described herein), and/or (v) provide an interface via which a user (such as an insured) may receive customized weather alerts, advice, and/or actions, coordinate assistance in accomplishing weather preparedness actions, and/or provide (e.g., upload) evidence of completed weather preparedness actions (e.g., prior to a loss event or as part of a claim handling process).

In some embodiments, the controller device 110 and/or the third-party device 106 (and/or the user devices 102a-n) may be in communication with the database 140. The database 140 may store, for example, insurance policy data, weather data, location data, customer data, and/or preparedness action data obtained from the user devices 102*a-n* and/or the third-party device 106, weather alert data, weather tip and/or advice data, insurance premium and/or parameter data, and/or policy data defined by the controller device 110, and/or instructions that cause various devices (e.g., the controller device 110, the third-party device 106, and/or the user devices 102*a-n*) to operate in accordance with embodiments described herein. In some embodiments, the database 140 may comprise any type, configuration, and/or quantity of data storage devices that are or become known or practicable. The database 140 may, for example, comprise an array of optical and/or solid-state hard drives configured to store policy, customer, weather, weather tip, preparedness action, and/or location data provided by (and/or requested by) the user devices 102*a-n* and/or the third-party device 106, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the user devices 102*a-n* or third-party device 106 may comprise the database 140 or a portion thereof, for example, and/or the controller device 110 may comprise the database or a portion thereof.

Figure 2:
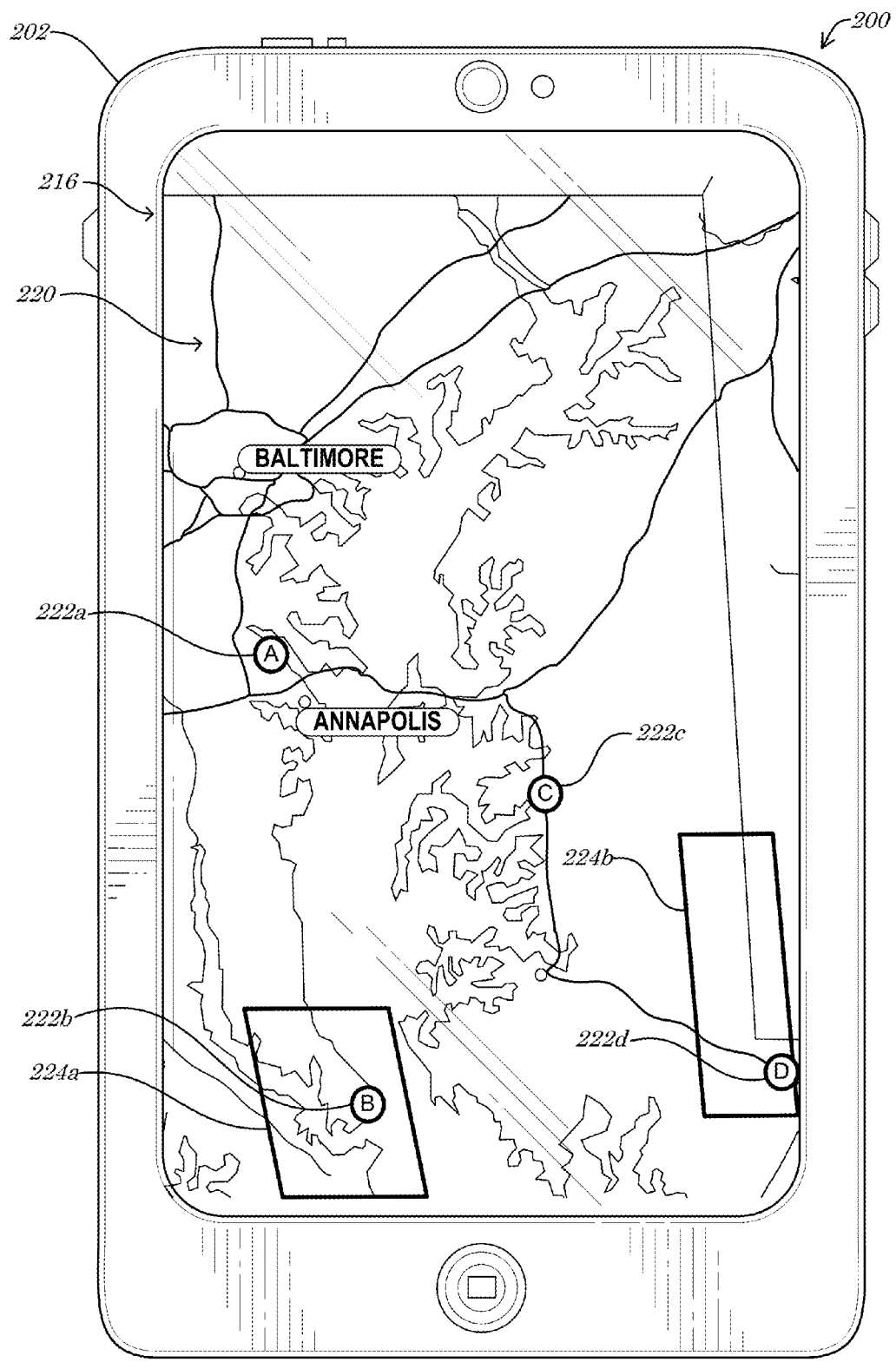
FIG. 2 is a block diagram of a system according to some embodiments.

Referring now to FIG. 2, a block diagram of a system 200 according to some embodiments is shown. In some embodiments, the system 200 may comprise a mobile electronic device 202, such as a smart phone, tablet computer, smart watch, or the like. In some embodiments, the mobile electronic device 202 may comprise an input/output device 216 such as a touch-sensitive display screen. According to some embodiments, the input/output device 216 may provide an interface 220, such as the map interface depicted in FIG. 2. The interface 220 may, for example, comprise a combination of output and associated input regions, objects, or mechanisms via which a user (not shown) of the mobile electronic device 202 may receive and provide data. In some embodiments, the interface 220 may be utilized to setup, define, provide, and/or receive customized and/or personalized weather alerts, tips, and/or preventative action advice.

According to some embodiments, the interface 220 may be utilized by a user to define a plurality of locations associated with the user. As depicted in the non-limiting example of FIG. 2, the user may select, identify, and/or otherwise define a first location 222*a* labeled "A" (which may be the user's home or residence, for example) and/or a second location 222*b* labeled "B" (which may be a vacation or weekend home, for example). In some embodiments, locations associated with the user may otherwise be determined and displayed via the interface 220. A third location 222*c* labeled "C" may comprise a current location of the user, an electronic device utilized by the user, or a vehicle of the user, for example, while a fourth location 222*d* labeled "D" may comprise a destination of the user and/or the user's vehicle (e.g., car, train, airline flight). Any or all of the locations 222*a-d* may be derived or determined based on user input (e.g., via the interface 220) and/or based on other sources of data associated with the user, such as third-party vehicle location data, trip and/or navigational data, electronic device data, etc.

In some embodiments, information defining the plurality of locations 222*a-d* associated with the user may be utilized to determine when and/or how to send weather alerts to the user. Typically weather alert systems, for example, provide broadcast weather alert signals with the presumption that if a user operates a device that receives the broadcast signal, then the user/device must be within the broadcast alert zone intended for a particular weather alert. Some weather alert systems have become slightly more advanced by providing regional or area-based codes with broadcast alerts. The NWR broadcasts, for example, now include Specific Area Message Encoding (SAME) that allows receiving devices to be configured to filter out alerts not applicable to a user's designated region or area. SAME codes must typically be identified and entered manually by a user and are static in nature once defined. A user of the system 200 may, for example, configure the mobile electronic device 202 to receive, recognize, or output NWR alert signals applicable to the first location 222*a* "A", such as by providing input (e.g., via the interface 220) identifying a SAME code of "024003" which is applicable to Anne Arundel County in Maryland. In typical systems, however, this would generally be the extent of the functionality available to the user.

In contrast, the system 200 may be utilized to selectively provide weather alerts to the user and/or to the mobile electronic device 202 based on data associated with any of the plurality of locations 222*a-d*. The user may, for example, configure the mobile electronic device 202 to receive weather alerts for the first location 222*a* "A" as well as for the second location 222*b* "B". According to some embodiments, the user may define rules, triggers, and/or constraints or criteria defining how or when weather alerts for the first and second locations 222*a-b* are to be provided and/or output. The user may provide input specifying that all weather alerts for the first location 222*a* "A" should be output by the mobile electronic device 202 (and/or should be output in a first particular manner such as utilizing a first particular tone, sound, message, etc.), for example, as well as input specifying that only flood-related weather alerts for the second location 222*b* "B" should be output (and/or should be output in a second particular manner such as utilizing a second particular tone, sound, message, etc.). In such a manner, for example, even though the user and/or the mobile electronic device 202 may be located at the first location 222*a* "A", a first weather alert descriptive of a first weather alert zone 224*a* may be provided to the user (e.g., to warn the user of an impending weather-related issue at the second location 222*b* "B").

In some embodiments, one or more of the locations 222*a-d* associated with the user may be automatically determined (e.g., in the absence of direct input from the user defining such locations 222*a-d*). The third location 222*c* "C" may, for example, comprise a current location of the user, the mobile electronic device 202, and/or a vehicle of the user, as determined utilizing location-sensing technologies and/or methodologies, such as cell phone signal triangulation, Global Positioning System (GPS) signals, Radio Frequency IDentification (RFID), Bluetooth®, or NFC signals, or the like. In other words, any weather alerts applicable to the third location 222*c* "C" may be automatically provided to the user, even though the user has not previously input or specified a SAME code for the area in which the third location 222*a* "C" resides. In such a manner, for example, weather alerts may be provided in a dynamic fashion in accordance with the user's travel and/or movements without requiring location-specifying input from the user. In some embodiments, information regarding a path, route, roadway, and/or other travel-related itinerary or information may be utilized to identify one or more of the locations 222*a-d*. The user may, for example, have programmed a destination or route into a navigational device (not shown) of the user's vehicle or may have defined such travel itinerary data via a mobile device application, such as a navigational application executed by the mobile electronic device 202. The system 200 may utilize such data to predict future locations of the user, the mobile electronic device 202, and/or a vehicle or other object associated with the user. The system 200 may, for example, provide a second weather alert descriptive of a second weather alert zone 224b associated with the fourth location 222d "D" (e.g., to warn the user of an impending weather-related issue at the fourth location 222d "D"), such as in the case that the fourth location 222d "D" has been identified by the user as a destination, or in the case that a current defined route of the user is predicted to take the user through or near the fourth location 222d "D", or in the case that a current travel direction, current roadway traveled on, and/or velocity of the user are predicted by the system 200 to place the user at or near the fourth location 222d "D" during an applicable timeframe of the second weather alert zone 224b being active.

According to some embodiments, the interface 220 and/or the mobile electronic device 202 may be utilized to provide customized weather tips and/or action suggestions to the user. In addition to the weather alerts, for example, the user may be provided with tips regarding how the user should prepare for and/or react to the provided alerts (or weather/events associated therewith). In the case that the first weather alert descriptive of the first weather alert zone 224a comprises a flash flood watch, for example, a weather tip may be provided that suggests that the user move valuables from lower floors of a house to higher floors to minimize the likelihood of flood damage and/or to reduce the likely amount of loss in the case of an actual flood. Similarly, in the case that the second weather alert descriptive of the second weather alert zone 224b comprises a hail warning, a weather tip may be provided suggesting that the user avoid driving a vehicle in the area of the fourth location 222d "D". According to some embodiments, the interface 220 may be utilized to suggest alternate routes for the user to avoid potential hail damage to the user's vehicle.

In some embodiments, the weather tips may be customized. In the case that it is known (e.g., by the system 200, such as via data stored in a database not shown in FIG. 2) that the user owns a boat kept in the water at the second location 222b "B", for example, the weather tip provided along with the first weather alert defining the flash flood watch for the first weather alert zone 224a may specify that the user should remove the boat from the water to avoid damage. Similarly, in the case that it is known (e.g., by the system 200, such as via data stored in a database not shown in FIG. 2) that the user's vehicle traveling at the third location 222c "C" and toward the fourth location 222d "D" is outfitted with low-profile, high-performance street tires, for example, the weather tip provided along with the second weather alert defining the hail warning (or a winter weather advisory, for example) for the second weather alert zone 224b may specify that the user should avoid travel through the second weather alert zone 224b and/or should take specific action like disabling an automatic stability or traction control feature of the vehicle.

According to some embodiments, the user may be provided with specific weather event preparation action suggestions (e.g., in response to the system 200 having identified an active weather alert applicable to one or more of the user's locations 222a-d). As described with respect to the continuing and non-limiting example of the user's boat at the second location 222b "B", for example, specific characteristics and/or attributes or parameters of the boat, the user's vehicle (e.g., utilized to travel to the fourth location 222d "D"), and/or other objects or entities may be utilized to define and/or provide specific action recommendations for the user. With respect to the boat, for example, an indication may be stored in a database that defines a characteristic of the boat as having a cabin. Additional stored and/or acquired data may even indicate a current status of a door or hatch to the cabin such as "closed" or "unlocked". In the case that the second weather alert associated with the second weather alert zone 224b, which includes the second location 222b "B" of the boat, comprises a weather alert of one or more specific and/or predetermined types, in accordance with some embodiments the system 200 may make a determination that a current status of the cabin door should be changed. It may be determined, for example, that a particular door, hatch, compartment, and/or component should be secured in advance of the predicted weather event. According to some embodiments, the system 200 may facilitate compliance with the suggested customized weather preparedness action, such as by suggesting how the action may be accomplished (e.g., providing graphical and/or video-based instructions), suggesting a local entity or asset that can accomplish the action on behalf of the user (e.g., marina staff), and/or automatically transmitting an electronic command that causes an electronic component of the boat to accomplish the specified action (e.g., a remotely-controllable electronic lock, latch, and/or other electromechanical component). In some embodiments, some or all of the location, alert, tips, specific action, and/or object data may be stored in one or more databases, such as in a relational manner.

Referring to FIG. 3, for example, a diagram of an example data storage structure 340 according to some embodiments is shown. In some embodiments, the data storage structure 340 may comprise a plurality of data tables, such as a customer table 344a, a weather alert table 344b, a weather tip table 344c, a location table 344d, and/or an insurance data table 344e. The data tables 344a-e may, for example, be utilized (e.g., at 402, 404, 406, and/or 410 of the method 400 of FIG. 4) to store, modify, update, retrieve, and/or access various information related to customers (or other users), locations associated with customers, weather alerts (e.g., active weather alerts), weather preparedness tips, specifically-tailored weather preparedness actions and/or suggestions thereof, and/or available pathways and/or mechanisms via which the specifically-tailored weather preparedness actions may be effectuated.

The customer table 344a may comprise, in accordance with some embodiments, a customer IDentifier (ID) field 344a-1, a street address field 344a-2, a city field 344a-3, a state field 344a-4, a ZIP Code field 344a-5, and/or a location Identifier (ID) field 344a-6, and/or a location type field 344a-7. Any or all of the ID fields 344a-1, 344a-6 may generally store any type of identifier that is or becomes desirable or practicable (e.g., a unique identifier, an alpha-numeric identifier, and/or an encoded identifier). As an example of how the example data structure 340 may be utilized in accordance with some embodiments, the customer table 344a may store information relating to particular customers (e.g., identified by unique identifiers and/or codes stored in the customer ID field 344a-1) to a plurality of particular locations (such as the locations 222a-d of FIG. 2), so that a customer may receive weather alerts for a plurality of locations of interest to the customer.

The weather alert table 344b may comprise, in accordance with some embodiments, a weather alert ID field 344b-1, a weather alert type field 344b-2, a severity field 344b-3, and/or a location ID field 344b-4. The weather alert table 344b may store, for example, data descriptive of various weather alerts (e.g., active weather alerts) such as based on NWR and/or other governmental or private weather forecasting entities. In some embodiments, the weather alert type field 344b-2 may store an indication of a type of alert, such as a flood warning, a tornado watch or warning, a small craft advisory, a winter storm warning, a poor air quality alert, a wildfire warning, a hazardous weather outlook statement, etc. According to some embodiments, the severity field 344b-3 may store data indicative of a level of severity, ranking, and/or other measure of a weather event for which the alert has been issued. Various qualitative and/or quantitative scales and/or metrics such as the Saffir-Simpson Hurricane Wind Speed Scale, the Richter magnitude scale, and/or the Fujita Scale (or F-Scale) for providing relative measures of tornado strength. In some embodiments, the severity field 344b-3 may store an indication of a likelihood of the weather event occurring (e.g., forty percent (40%) chance of strong thunderstorms) and/or a likelihood or probability of certain magnitudes of weather or other natural events occurring, such as a twenty percent (20%) chance of wave heights over three (3) feet, or a one hundred percent (100%) chance of wind speeds in excess of thirty (30) knots. In some embodiments, the location ID field 344b-4 may store an indication of one or more locations associated with the weather alert (e.g., one or more predefined areas (such a SAME area or county), one or more ZIP Codes, one or more coordinates, and/or one or more coordinate polygons (e.g., defining coordinate bounds within which all coordinates are deemed associated with the active weather alert).

The weather tip table 344c may comprise, in accordance with some embodiments, a weather tip ID field 344c-1, an alert trigger field 344c-2, and/or a weather tip field 344c-3. The alert trigger field 344c-2 may store, for example, an indication of one or more weather types and/or weather alert types (e.g., watches as opposed to warnings and/or hail as opposed to wind alerts and/or weather events) for which any specific weather tip is applicable. Upon occurrence of a particular weather type and/or weather alert type matching the criteria set forth in the alert trigger field 344c-2, for example, any weather tips having the trigger may be provided to a user. The weather tip field 344c-3 may generally store media (text, sound, video, etc.) defining the content of the weather tip, such as "move indoors", as depicted. According to some embodiments, weather tips stored in the weather tip table 344c may be generic tips based on particular weather event types, severities (or ranges of severities), and/or weather alert types. In some embodiments, weather tips stored in the weather tip table 344c may comprise customized, personalized, and/or targeted tips that combine general or generic advice or suggestions with specific actions tailored to a user's particular circumstances and/or needs.

The location table 344d may comprise, in accordance with some embodiments, a location ID field 344d-1, a customer ID field 344d-2, a location type field 344d-3, and/or a coordinates field 344d-4. The location table 344d may, for example, store data descriptive of a plurality of locations associated with one or more particular customers (e.g., the locations 222a-d of FIG. 2). As depicted for example purposes in FIG. 3, the customer or user associated with the customer ID "1234-5678" stored in the customer ID field 344d-2 is associated with each of the four (4) different locations represented by the data rows in the location table 344d. In some embodiments, the location type field 344d-3 may store an indication of a type or class of a location. As depicted in FIG. 3, for example, the four (4) locations associated with the customer/user may comprise a "residence" location, a "boat" location, a "car" location, and/or a "destination" location. These various location types may, in some embodiments, correspond to each of the four (4) locations 222a-d depicted on the interface 220 of FIG. 2 (e.g., "A", "B", "C", and "D", respectively). The coordinates field 344d-4 may generally store any location identifying data that is or becomes known or practicable, such as GPS coordinates, postal addresses, latitude and longitude coordinates, and/or a unique or proprietary certified location identifier.

The insurance data table 344e may comprise, in accordance with some embodiments, an insurance ID field 344e-1, a customer ID field 344e-2, a location ID field 344e-3, an insurance type field 344e-4, an insured object field 344e-5, and/or an object status field 344e-6. The insurance data table 344e may, for example, store data descriptive of insurance-related attributes, qualities, and/or characteristics that are associated with a particular customer, customer location, and/or insured object. In some embodiments, the insurance type field 344e-4 may store data descriptive of a type of insurance associated with a particular location and/or object or individual at a location. The insured object field 344e-5 may generally store data descriptive of an object and/or entity that is the subject of an insurance policy for which the data in the insurance data table 344e is stored. According to some embodiments, the object status field 344e-6 may store data descriptive of a status, attribute, value, metric, quality, and/or characteristic the object being insured. Continuing the example of the user having a boat at the second location 222b "B" in FIG. 2, for example, such location may correspond to the second data record in the insurance data table 344e storing an identifier of "8967S5SS" for a location for which a marine insurance policy (indicated by the data stored in the insurance type field 344e-4) covers a boat (indicated by the data stored in the insured object field 344e-5) that is currently in the water (indicated by the data stored in the object status field 344e-6).

As indicated by the example data in the data storage structure 340, the location identified by the alphanumeric identifier "8967S5SS" may be subject to a current weather alert "WFSB-9K98" stored in the third data record of the weather alert table 344b. The weather alert may indicate a "flood" type of alert (as stored in the weather alert type field 344b-2), which may correspond to the data trigger for "flood" types of weather events or alerts (stored in the alert trigger field 344c-2 of the weather tip table 344c). The occurrence of a match or other favorable comparison of the alert or weather type to the trigger criteria may, for example, cause the weather tip (stored on the weather tip field 344c-3) of "remove boat from water" to be provided to the user. In some embodiments, the provided weather tip may be specifically chosen due to the fact that the insured object at the location in question is a boat and/or due to the status of the boat being identified as being in the water. Other users that do not have a boat at the location (but live there instead, for example) or that own a boat that is not currently in the water, for example, may not receive the same weather tip/suggestion.

In some embodiments, customized weather tips and/or suggested actions (and/or facilitations of the actions) may be defined and/or provided by relationships established between two or more of the data tables 344a-e. As depicted in the example data storage structure 340, for example, a first relationship "A" may be established between the weather alert table 344b and the weather tip table 344c. In some embodiments (e.g., as depicted in FIG. 3), the first relationship "A" may be defined by utilizing the weather-related peril field 344*b*-2 as a data key linking to the alert trigger field 344*c*-2. According to some embodiments, the first relationship "A" may comprise any type of data relationship that is or becomes desirable, such as a one-to-many, many-to-many, or many-to-one relationship. In the case that multiple weather tips and/or actions are likely to be applicable to a certain weather alert and/or weather type, the first relationship "A" may comprise a many-to-one relationship (e.g., many weather tips and/or actions per single weather and/or weather-related peril).

According to some embodiments, a second relationship "B" may be established between the customer table 344*a* and the location table 344*d*. In some embodiments (e.g., as depicted in FIG. 3), the second relationship "B" may be defined by utilizing the customer ID field 344*a*-1 as a data key linking to the customer ID field 344*d*-2. According to some embodiments, the second relationship "B" may comprise any type of data relationship that is or becomes desirable, such as a one-to-many, many-to-many, or many-to-one relationship. In the case that multiple locations are associated with a single customer, the second relationship "B" may comprise a many-to-one relationship (e.g., many locations per single customer). In such a manner, for example, weather alerts and/or tips or actions may be provided to a user/customer for any number of locations associated with the user/customer.

In some embodiments, a third relationship "C" may be established between the customer table 344*a* and the weather alert table 344*b*. In some embodiments (e.g., as depicted in FIG. 3), the third relationship "C" may be defined by utilizing the location ID field 344*a*-6 as a data key linking to the location ID field 344*b*-4. According to some embodiments, the third relationship "C" may comprise any type of data relationship that is or becomes desirable, such as a one-to-many, many-to-many, or many-to-one relationship. In the case that multiple locations are likely to be associated with a particular weather alert, the third relationship "C" may comprise a many-to-one relationship.

According to embodiments, a fourth relationship "D" may be established between the weather alert table 344*b* and the location table 344*d*. In some embodiments (e.g., as depicted in FIG. 3), the fourth relationship "D" may be defined by utilizing the location ID field 344*b*-4 as a data key linking to the location ID field 344*d*-1. According to some embodiments, the fourth relationship "D" may comprise any type of data relationship that is or becomes desirable, such as a one-to-many, many-to-many, or many-to-one relationship. In the case that a particular weather alert is likely to be applicable to a plurality of locations, the third relationship "C" may comprise a one-to-many relationship. According to some embodiments, either or both of the third relationship "C" and the fourth relationship "D" may be utilized to relate weather alerts with various locations, as is or becomes desirable or practicable.

In some embodiments, a fifth relationship "E" may be established between the location table 344*d* and the insurance data table 344*e*. In some embodiments (e.g., as depicted in FIG. 3), the fifth relationship "E" may be defined by utilizing the location ID field 344*d*-1 as a data key linking to the location ID field 344*e*-3. According to some embodiments, the fifth relationship "E" may comprise any type of data relationship that is or becomes desirable, such as a one-to-many, many-to-many, or many-to-one relationship. In the case that a single insurance policy is likely to cover a single location (or object at the location), the fifth relationship "E" may comprise a one-to-one relationship. In the case that multiple insurance policies are likely to cover a particular location (or object at the location), the fifth relationship "E" may comprise a many-to-one relationship. In the case that a single insurance policy is likely to cover multiple locations (or objects at one or more locations), the fifth relationship "E" may comprise a one-to-many relationship.

Utilizing the various relationships, "A", "B", "C", "D", and/or "E", it may accordingly be possible to readily identify for any particular customer and/or location (or plurality of locations per customer), any relevant and/or applicable weather alerts. Based on the active alerts (e.g., the type of alert and/or type of weather or other natural event related thereto), one or more applicable and/or relevant weather tips may be readily identified for provision to a customer/user. The weather tips may be refined, modified, and/or customized based on insurance data stored in the related tables 344*a-e* and/or specific weather preparedness and/or loss prevention or reduction measures or actions may be defined and provided to the customer/user.

In some embodiments, fewer or more data fields than are shown may be associated with the data tables 344*a-e*. Only a portion of one or more databases and/or other data stores is necessarily shown in the data storage structure 340 of FIG. 3, for example, and other database fields, columns, structures, orientations, quantities, and/or configurations may be utilized without deviating from the scope of some embodiments. Further, the data shown in the various data fields is provided solely for exemplary and illustrative purposes and does not limit the scope of embodiments described herein.

Figure 4:
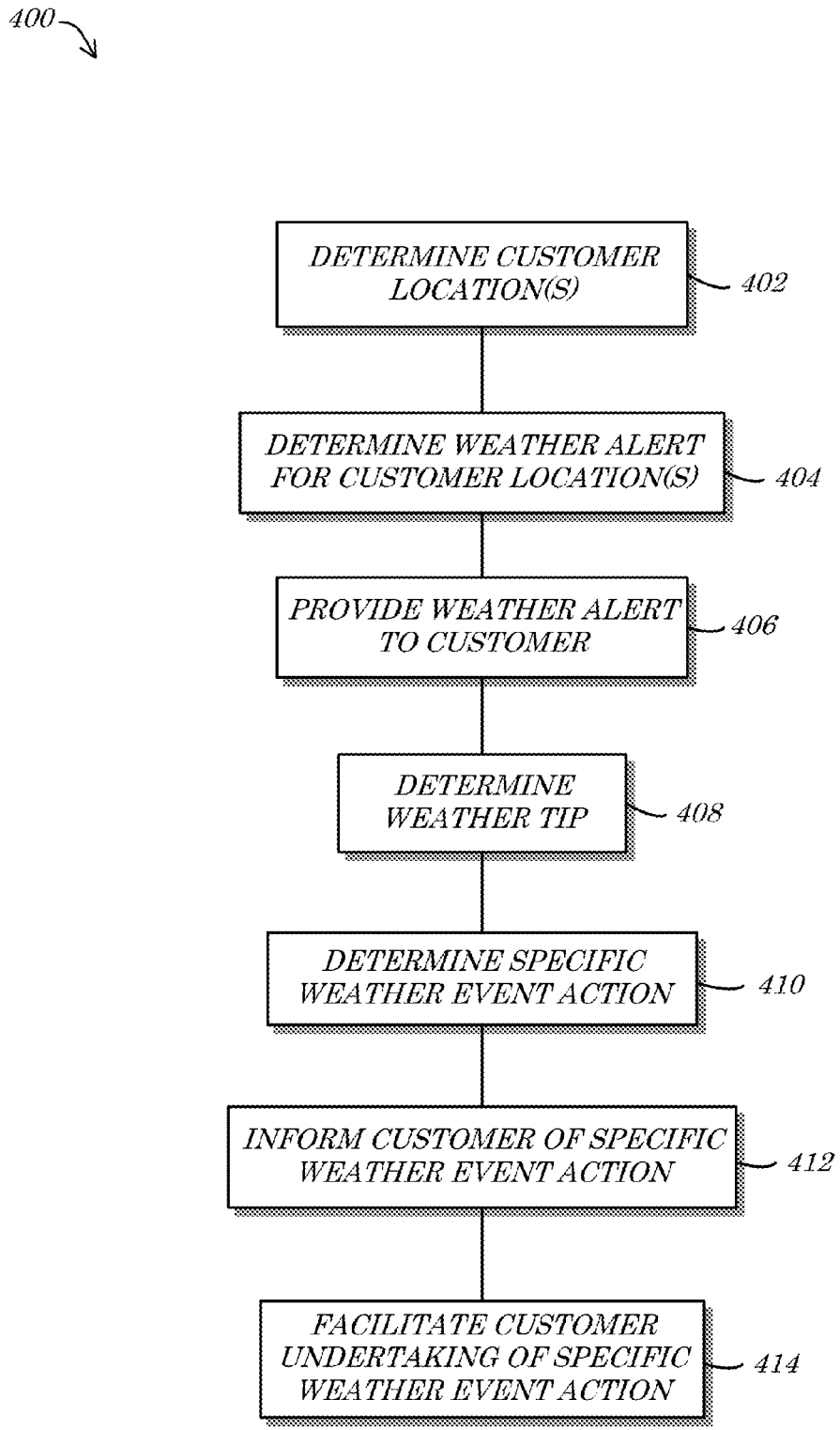
FIG. 4 is a flow diagram of a method according to some embodiments.

Referring now to FIG. 4, a flow diagram of a method 400 according to some embodiments is shown. In some embodiments, the method 400 may be performed and/or implemented by and/or otherwise associated with one or more specialized and/or specially-programmed computers (e.g., the user devices 102*a-n*, the third-party device 106, and/or the controller device 110, all of FIG. 1), computer terminals, computer servers, computer systems and/or networks, and/or any combinations thereof (e.g., by one or more insurance company and/or underwriter computers). In some embodiments, the method 400 may cause an electronic device such as the mobile electronic device 202 of FIG. 2 to perform certain steps and/or commands and/or may cause an outputting and/or management of input/output data via one or more graphical interfaces such as the interface 220 of FIG. 2.

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the data storage devices 140, 340, 640, 740*a-e* of FIG. 1, FIG. 3, FIG. 6, FIG. 7A, FIG. 7B, FIG. 7C, FIG. 7D, and/or FIG. 7E herein) may store thereon instructions that when executed by a machine (such as a computerized processor)

result in performance according to any one or more of the embodiments described herein.

According to some embodiments, the method 400 may comprise determining (e.g., by an electronic processing device) a customer location, at 402. A server device and/or other electronic network component may, for example, receive one or more data transmissions descriptive of and/or defining the customer location. In some embodiments, the transmission may originate from a mobile electronic device of the customer and/or another user (e.g., the mobile electronic device 202 of FIG. 2). For example, the mobile device of the insurance customer may comprise the customer's device and/or any device associated with or accessible by the customer. According to some embodiments, the transmission may include data descriptive of one or more location-identifying metrics and/or values, such as latitude and longitude coordinates, postal addresses, logical addresses or identifiers, GPS coordinates, etc. In some embodiments, the customer location may comprise a current location of the customer/user and/or a device associated therewith (e.g., a mobile electronic device registered to the customer). According to some embodiments, the customer location may comprise a plurality of locations, such as an identification of a residence of the customer, a workplace of the customer, a location where the customer parks a vehicle, a current location of a vehicle of the customer, and/or a future destination of the customer and/or a vehicle or electronic device of the customer (e.g., a predicted destination and/or a destination for which an indication of future likelihood of travel has been received). According to some embodiments, a customer and/or other user (and/or a device thereof) may provide indications of multiple customer locations, such as the various locations 222a-d of FIG. 2.

In some embodiments, the method 400 may also or alternatively comprise determining (e.g., by the electronic processing device) a weather alert for the customer location, at 404. Identifying information descriptive of the customer location(s) may be utilized, for example, to query a database and determine therefrom whether any active weather alerts encompassing the customer location(s) have been issued (e.g., by one or more weather-alert authorities such as the NWS). According to some embodiments, active weather alert data may be stored in a database and customer location data may be periodically compared to the stored data to determine any matching and/or applicable alerts. In some embodiments, customer location data may be stored in a database and incoming data (e.g., from a NWR broadcast signal) may be compared to the stored location data to determine if any active alert matches and/or is applicable to any stored customer location data. In some embodiments, time stamps and/or time-related data may be utilized as part of the comparison process. In the case that a customer location comprises a navigational destination for which the customer is schedule to arrive at a particular time in the future, for example, a timeframe or range for a weather alert applicable to the location may be compared to the Estimated Arrival Time (ETA) of the customer/customer vehicle/device to determine if the alert is both applicable to the location, as well as the ETA. In some embodiments, in the case that the weather alert is applicable to the location but expires prior to the ETA of the customer, the alert may be ignored or may be provided to the customer with a decreased level of importance or applicability noted.

According to some embodiments, the method 400 may also or alternatively comprise providing (e.g., by the electronic processing device and/or via an electronic communications network) the weather alert to the customer, at 406. Any weather alert deemed relevant to a customer location at 404, for example, may be transmitted to a device of the customer and/or provided for access to the customer, such as via a web-interface. In some embodiments, the applicable weather alert may be transmitted to the customer via a mobile device notification protocol and/or service, such as the Google® Cloud Messaging™ service for Andriod®-compatible device or the Apple® push notification service for Apple®-compatible devices. According to some embodiments, the alert sent to the customer may include additional information, such as which of the customer's plurality of associated locations the alert is applicable to and/or a severity of the alert and/or predicted weather event.

In some embodiments, the method 400 may also or alternatively comprise determining (e.g., by the electronic processing device) a weather tip, at 408. Data defining the weather alert, the location, and/or one or more additional data elements may be utilized, for example, to query a database of weather tip and/or advice data to identify any tips/advice that are relevant to the location, customer, alert, predicted weather event, etc. According to some embodiments, a type of the weather alert and/or event may be utilized to identify one or more tips stored in the database. Some tips may be applicable to tornados, for example, while other tips may be applicable to weather "warnings" as opposed to weather "watches". In some embodiments, the weather tip may be selected and/or identified based on time-related metrics with respect to the alert and/or weather event. Certain tips may be applicable a month, a week, or a day in advance of a predicted weather event, for example, while other tips may be applicable to different timeframes after event occurrence, such as hours, days, weeks, or months after an occurrence of a weather event. In such embodiments, any weather event prediction timeframe and/or alert timeframe may be utilized to filter, refine, and/or select applicable weather tips that may, for example, be provided to the customer.

According to some embodiments, the method 400 may also or alternatively comprise determining (e.g., by the electronic processing device) a specific weather event action, at 410. The weather alert, predicted weather event (e.g., type and/or severity or magnitude), and/or any identified weather tips may, for example, be utilized to define one or more specific weather event actions that a particular customer should take. Instead of simply providing generic tips or advice, for example, specific instructions and/or desired actions may be identified for a specific customer. In some embodiments, insurance data associated with the customer may be utilized to define and/or construct the specific action(s). In the case that the customer has a homeowners' insurance policy that protects their home, for example, it may be known (e.g., indicated by data stored in a database) that the customer's house has automatically-enabled hurricane shutters. According to some embodiments, the specific weather event action may comprise instructions describing how and/or when the hurricane shutters should be engaged/lowered.

In some embodiments, the method 400 may also or alternatively comprise informing (e.g., by the electronic processing device and/or via the electronic communications network) the customer of the specific weather event action, at 412. A signal may be transmitted, for example, to one or more electronic devices of the customer, the signal including data identifying the specific weather event action, e.g., determined at 410. In some embodiments, instead of simply letting the customer know that an impending event (a predicted natural event) has triggered an alert (an active weather alert) applicable to the home (a location associated with and/or of the customer) and that the homeowner should secure the premises for potentially damaging high winds (a weather preparedness tip or advice), the customer may be specifically instructed to engage/lower the hurricane shutters (a specific weather event or weather preparedness action). In some embodiments, the information provided to the customer may include step-by-step instructions that may, for example, be based on manufacturer use and/or user manual data acquired for the specific brand, model, and/or serial number of the hurricane shutters. Specific weather event actions may include, in some embodiments, data defining when the specific actions or portions thereof should be accomplished—e.g., one (1) hour before the storm, one (1) day after the storm, etc. The instructions defining the specific weather event action(s) may be provided in various media formats such as text, pictures/photos, graphics, and/or video. In some embodiments, the format of the action instruction may be varied based on the capabilities of the destination device of the customer (e.g., text to a cell phone, video to a home PC or through the customer's set-top box). In some embodiments, the weather tip identified at 408 may also or alternatively be provided to the customer.

According to some embodiments, the method 400 may also or alternatively comprise facilitating (e.g., by the electronic processing device) an undertaking of the specific weather event action, at 414. The notification of the specific weather event action(s) may include, for example, tips, tricks, and/or step-by-step instructions facilitating compliance with the action(s) by the customer. In some embodiments, the customer may also or alternatively be provided with information defining entities and/or locations that may assist the customer in accomplishing the action. In the case that the action is boarding-up a window (e.g., in the absence of hurricane shutters), for example, the customer may be provided with a list of local stores that sell plywood, a list of local stores that are known to have plywood in stock (e.g., by checking online inventory on behalf of the customer prior to notifying the customer of the action), a link (or command) button that may be activated to cause a delivery request (e.g., a purchase order) for plywood (or even a certain amount of plywood based on the number of windows known to be in the customer's house) from a particular merchant to the customer location, and/or contact information for one or more entities (e.g., carpenters, laborers, handymen) that may board-up the windows for the customer. According to some embodiments, such as in the case that the customer is not at the location and/or may not be able to get to the location to effectuate the action(s) prior to the relevant timeframe, the information and/or link to local assistance may be quite useful. Once the customer receives the notification of the specific weather event action, for example, the customer may simply click a button on a provided interface (e.g., the interface 220 of FIG. 2) to send a message to or call a local asset capable of undertaking the action and make arrangements for the action to be taken.

In some embodiments, such as in the case of the remotely-controllable hurricane shutters utilized as an example above, the customer may be provided with an interface option to close the shutters. Upon activation of the option by the customer, the system may send a signal to the appropriate controlling device for the shutters (e.g., a home automation controller, a relay, a solenoid, etc.) to close. In such a manner, for example, the notification of the action may readily and easily allow the customer to complete (or request completion of) the desired weather preparedness action. According to some embodiments, such as in the case that the system is pre-authorized to take certain weather preparedness actions on behalf of the customer, the system may automatically engage the shutters even before the notification of the action has been sent to the customer. In such cases, the notification may include an indication that the action has been completed.

According to some embodiments, the customer may also or alternatively be prompted to take pictures and/or video of the location for which the alert, tips, and/or action are applicable. The customer may utilize a mobile electronic device, for example, to capture images and/or video of their home prior to an occurrence of a predicted weather event and may transmit such images to a server. In some embodiments, the images/video may be stored locally (e.g., on the mobile electronic device and/or on a home network storage location device) and securely time-stamped (e.g., via encoding and/or cryptographic processing) and may only be accessed and/or transmitted if they become desirable or necessary to review or process. The images/video may, for example, provide evidence of the physical condition and/or attributes of the location prior to the weather event and may accordingly be useful in analyzing claims for loss that may later arise due to the event. In some embodiments, the pictures/video may be utilized to verify and/or confirm that the customer has accomplished the desired specific weather event action(s)—e.g., a picture showing the hurricane shutters being closed, and presumably time-stamped to ensure that the picture is relevant to the current alert/event. According to some embodiments, the images and/or video provided by the customer may be analyzed to determine action compliance/completion and/or claim or loss data. In some embodiments, and depending upon the result of the image/video analysis, the customer may be provided with one or more incentives or penalties, such as an insurance rebate or discount (e.g., an insurance premium discount, a lowered insurance deductible, and/or an increase in an amount of insurance coverage, for properly and/or timely complying with the requested/suggested specific weather event action) or a surcharge (e.g., for failing to properly and/or timely complete the action).

Turning now to FIG. 5A, FIG. 5B, FIG. 5C, FIG. 5D, and FIG. 5E, diagrams of a system 500 depicting a user device 502 providing an example interface 520*a-e* according to some embodiments are shown. In some embodiments, the interface 520*a-e* may comprise a web page, web form, database entry form, Application Programming Interface (API), spreadsheet, table, and/or application or other Graphical User Interface (GUI) via which a customer or other entity may enter data to enable receipt of customized weather alerts, tips, and/or actions, such as with respect to multiple locations, as described herein. The interface 520*a-e* may, for example, comprise a front-end of a weather awareness program and/or platform programmed and/or otherwise configured to execute, conduct, and/or facilitate the method 400 of FIG. 4 herein, and/or portions thereof. In some embodiments, the interface 520*a-e* may be output via a computerized device, such as the user device 502, which may for example, be similar in configuration to one or more of the user devices 102*a-n*, 202 and/or the controller device 110, or the apparatus 610, of FIG. 1, FIG. 2, and/or FIG. 6 herein.

Figure 5A:
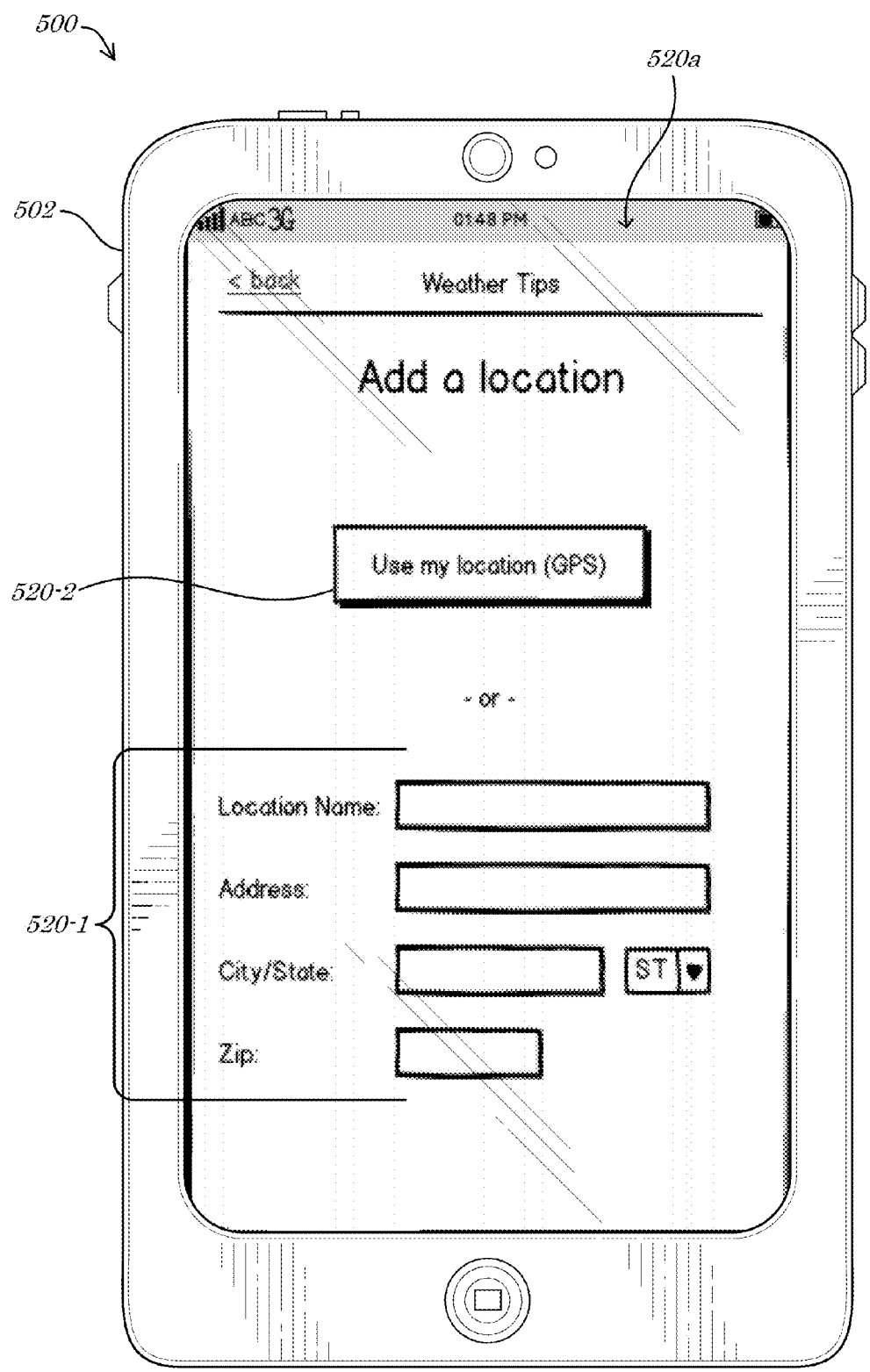
FIG. 5A, FIG. 5B, FIG. 5C, FIG. 5D, and FIG. 5E are diagrams of a system providing example interfaces according to some embodiments.

According to some embodiments, the interface 520*a-e* may comprise one or more tabs and/or other segmented and/or logical-presented data forms and/or fields. In some embodiments, the interface 520*a-e* may be configured and/or organized to allow and/or facilitate entry of information regarding a business, residence, policy, customer account (and/or potential customer account), and/or other location or object of interest with respect to weather alerts and preparedness. As depicted in FIG. 5A, for example, a first version (or page or instance) of the interface 520*a* may comprise an "Add Location" interface (e.g., input and/or output mechanism), such as by providing an area (e.g., one or more data entry mechanisms, tools, objects, and/or features) that provides for entry/editing of address data 520-1 descriptive of a location of a business, residence, an account, policy, and/or a location of an object subject to an insurance product. As depicted, a name, street address, city, state, and/or ZIP Code of a location may be entered by a user (and accordingly received by the user device 502 and/or by another device in remote and/or wireless communication with the user device 502 (such other device not shown in FIG. 5A).

In some embodiments, the first version (or page or instance) of the interface 520*a* may also or alternatively comprise a location button 520-2. The location button 520-2 may, when actuated or selected by the user, for example, initiate a routine that attempts to locate the user device 502. The user device 502 may comprise GPS-enabled electronics, for example, that allow the user device 502 to be readily located via satellite, and/or may comprise other location-enabled functionality that permits the location to be discovered and/or deduced. In such a manner, for example, a user may identify a location for which weather alerts and/or preparedness tips or actions are desired. In some embodiments, as described herein, multiple such locations may be defined by the user (e.g., work, home, garage, boat, airplane, travel destination(s), business location(s), commercial vehicle location(s), etc.).

Figure 5B:
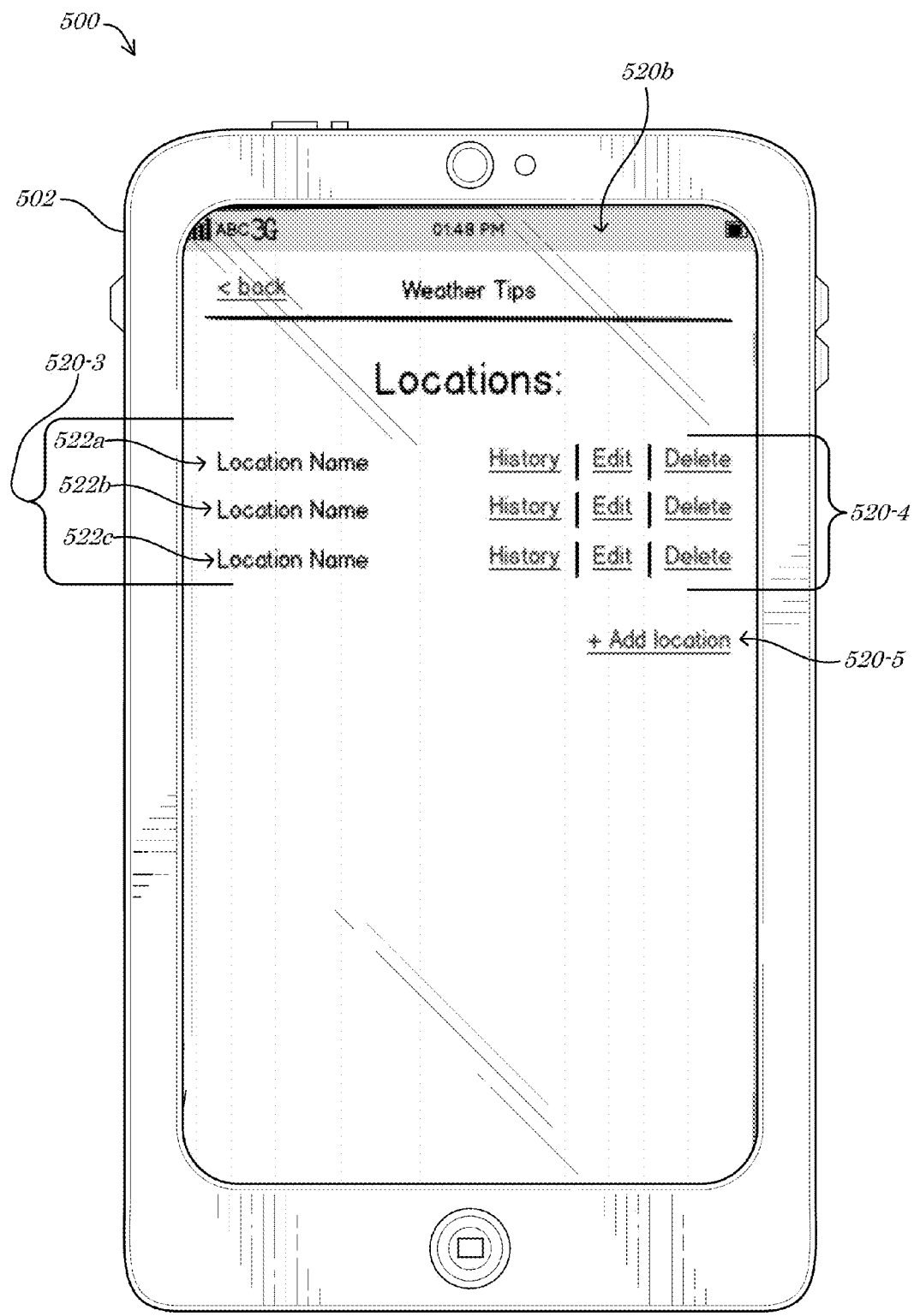

Referring to FIG. 5B, for example, a second version (or page or instance) of the interface 520*b* may comprise a "Locations" interface (e.g., input and/or output mechanism), such as by providing a listing 520-3 of a plurality of locations 522*a-c* associated with the user, user device 502, user account, etc. The first version (or page or instance) of the interface 520*a* may be utilized, for example, to "add a location" and the second version (or page or instance) of the interface 520*b* may be provided in response to an "add" event to show a complete listing of all locations 522*a-c* that have been entered and/or identified. In some embodiments, the second version (or page or instance) of the interface 520*b* may comprise action buttons 520-4 that enable the user, for example, to "edit", "delete", and/or show a "history" for any selected one of the plurality of locations 522*a-c*. According to some embodiments, an add location button 520-5 may be provided. The add location button 520-5 may, for example, comprise and/or enable a link or call to the first version (or page or instance) of the interface 520*a*, such that a user may be prompted, in response to a selection of the add location button 520-5, to add details for a new location for which data is desired to be stored.

Figure 5C:
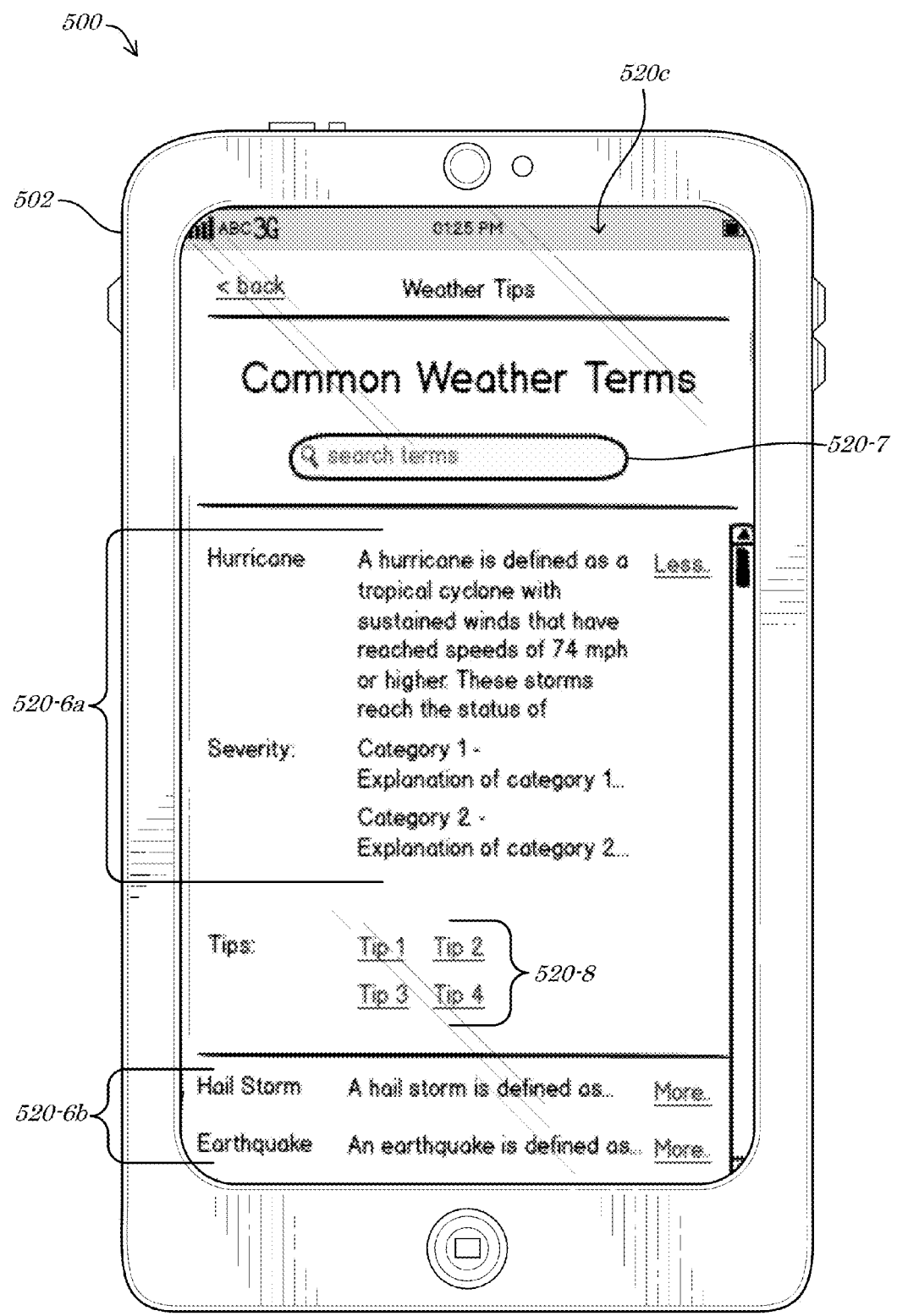

Turning to FIG. 5C, a third version (or page or instance) of the interface 520*c* may comprise a "Weather Dictionary" interface (e.g., input and/or output mechanism), such as by providing a plurality of definitions 520-6*a-b* for weather-related terminology. As depicted, for example, the term "hurricane" may comprise a first definition 520-6*a*, while other definitions 520-6*b* may also or alternatively be provided. In some embodiments, a search feature 520-7 may be provided, permitting or enabling a user to enter a search term to conduct a search of stored definitions 520-6*a-b*. According to some embodiments, the third version (or page or instance) of the interface 520*c* and/or the definitions 520-6*a-b* may comprise weather tip buttons 520-8. The weather tip buttons 520-8 may, for example, link to information descriptive of weather tips related to one or more particular definitions 520-6*a-b* (e.g., such as in the case that the first definition 520-6*a* of the "hurricane" is descriptive of a particular type of weather event or related weather alert type).

Figure 5D:
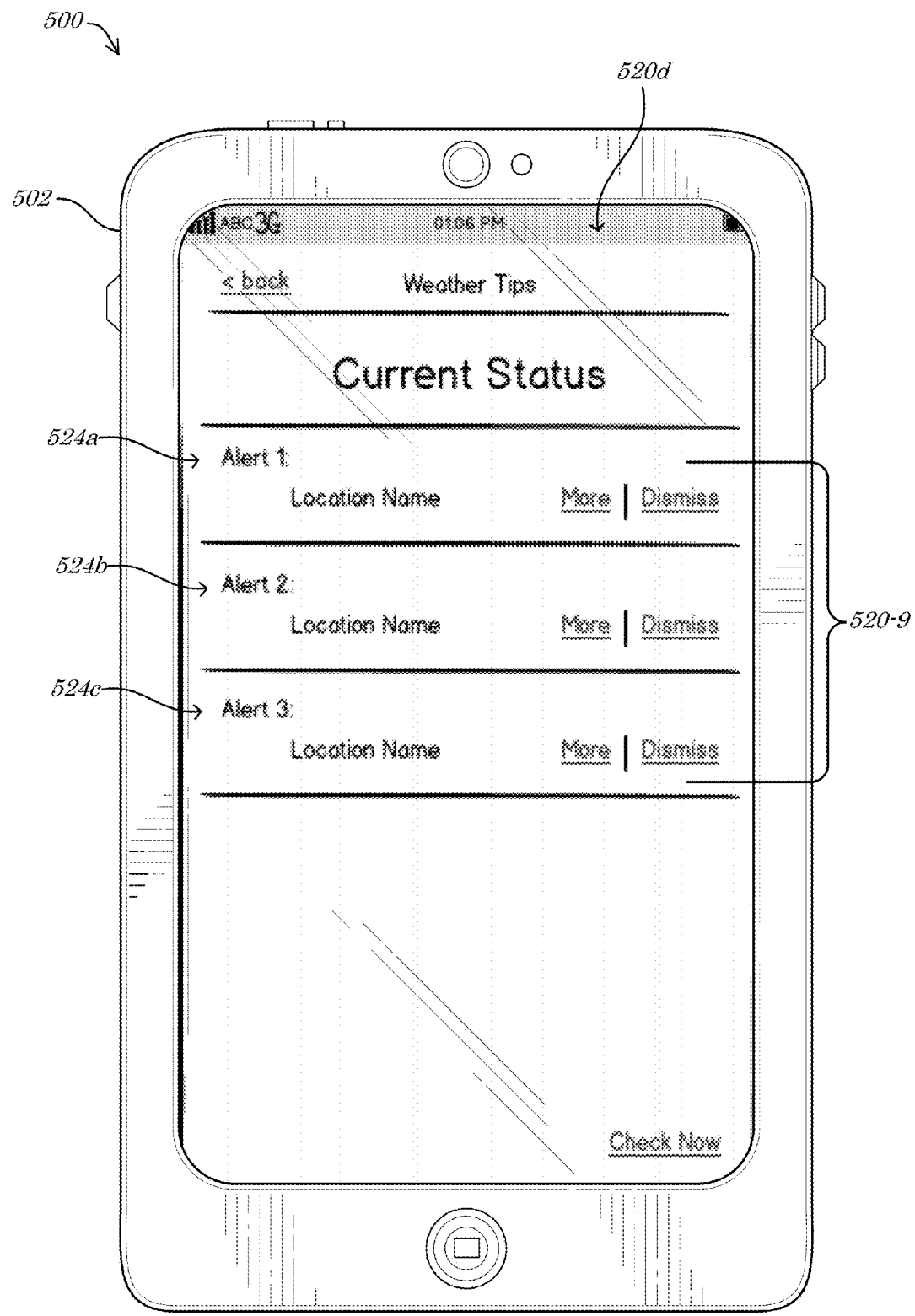

Referring to FIG. 5D, a fourth version (or page or instance) of the interface 520*d* may comprise a "Current Status" interface (e.g., input and/or output mechanism), such as by providing a plurality of weather alerts 524*a-c* (e.g., with respect to one or more of the stored or registered locations 522*a-c* of FIG. 5B). In some embodiments, the fourth version (or page or instance) of the interface 520*d* may comprise response buttons 520-9 that permit the user to, for example, "dismiss" (e.g., delete or render inactive) a particular weather alert 524*a-c* and/or retrieve "more" information (or actions) with respect to a particular weather alert 524*a-c*. In the context of weather alerts being tied-in to insurance processes, a selection of a "dismiss" response button 520-9 by the user may provide information to an insurance carrier regarding the user's awareness of the potential weather hazard and/or may indicate that the user has failed to pay proper attention to any dismissed weather alert 524*a-c* (e.g., evidencing a lack of preparedness by the user, which may in turn affect insurance premiums or claim handling processes). In some embodiments, a triggering and/or receipt of input from the user (e.g., a properly-positioned click of a mouse or other pointer) with respect to a "more" response button 520-9 may trigger provision of a different version of the interface 520*a-c*, 520*e* and/or may otherwise provide more details, such as customized weather tips, specific weather preparedness actions, and/or information that facilitates action completion (e.g., links to service providers proximate to one of the particular locations 522*a-c*).

Figure 5E:
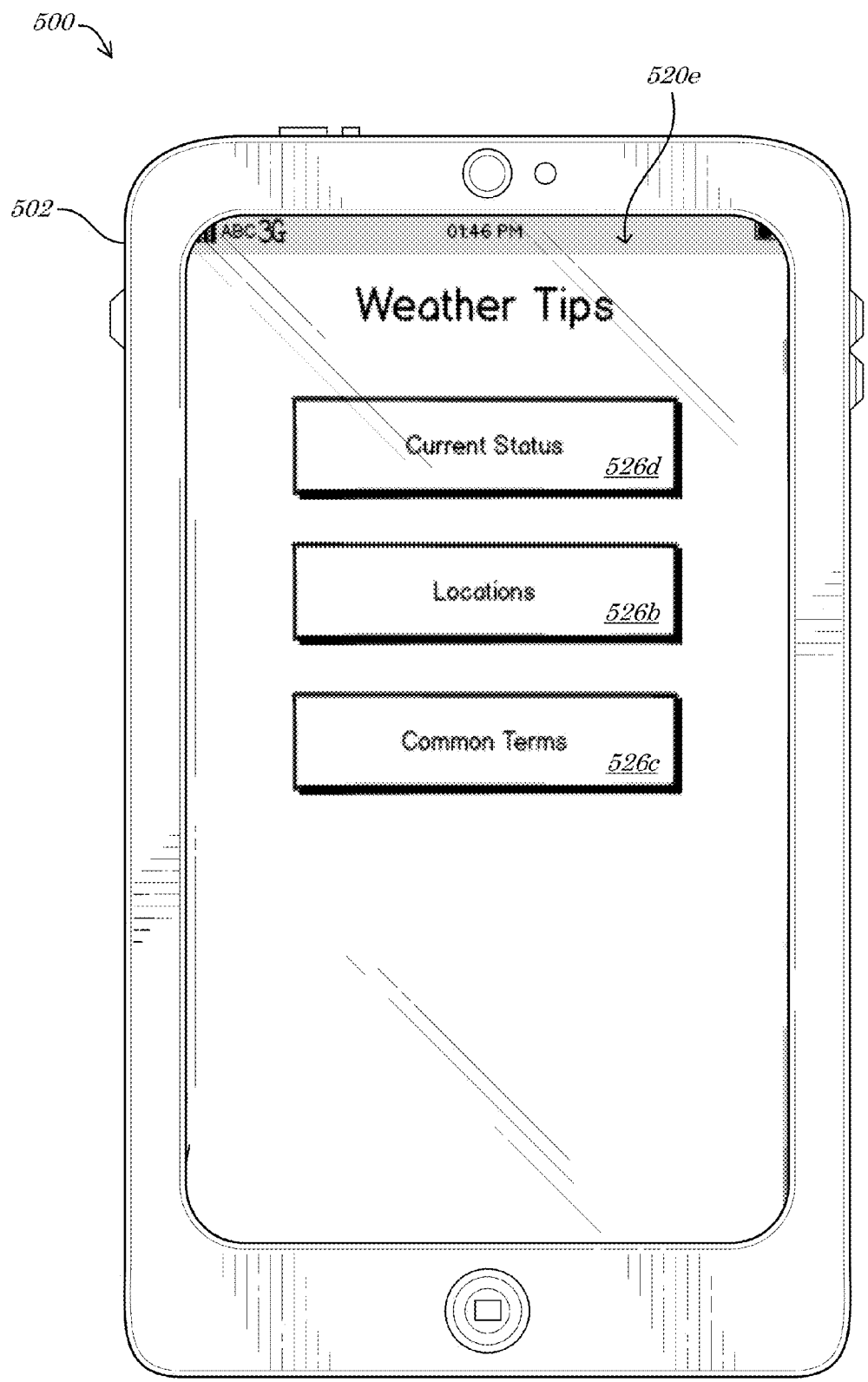

Turning to FIG. 5E, a fifth version (or page or instance) of the interface 520*e* may comprise a "Weather Tips" interface (e.g., input and/or output mechanism; such as a "home" screen or "main menu"), such as by providing one or more of a locations button 526*b*, a common terms button 526*c*, and/or a current status button 526*d*. The locations button 526*b* may, for example, upon a triggering and/or receipt of input from the user (e.g., a properly-positioned click of a mouse or other pointer) with respect to the locations button 526*b*, trigger a call to and/or otherwise cause a provision of the second version of the interface 520*b* and/or the respective listing 520-3 of a plurality of locations 522*a-c* thereof. In some embodiments, the common terms button 526*c* may, upon a triggering and/or receipt of input from the user (e.g., a properly-positioned click of a mouse or other pointer) with respect to the common terms button 526*c*, trigger a call to and/or otherwise cause a provision of the third version of the interface 520*c* and/or the respective definitions 520-6*a-b* thereof. According to some embodiments, the current status button 526*d* may, upon a triggering and/or receipt of input from the user (e.g., a properly-positioned click of a mouse or other pointer) with respect to the current status button 526*d*, trigger a call to and/or otherwise cause a provision of the fourth version of the interface 520*d* and/or the respective weather alerts 524*a-c* thereof.

While various components of the interface 520*a-e* have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

Figure 6:
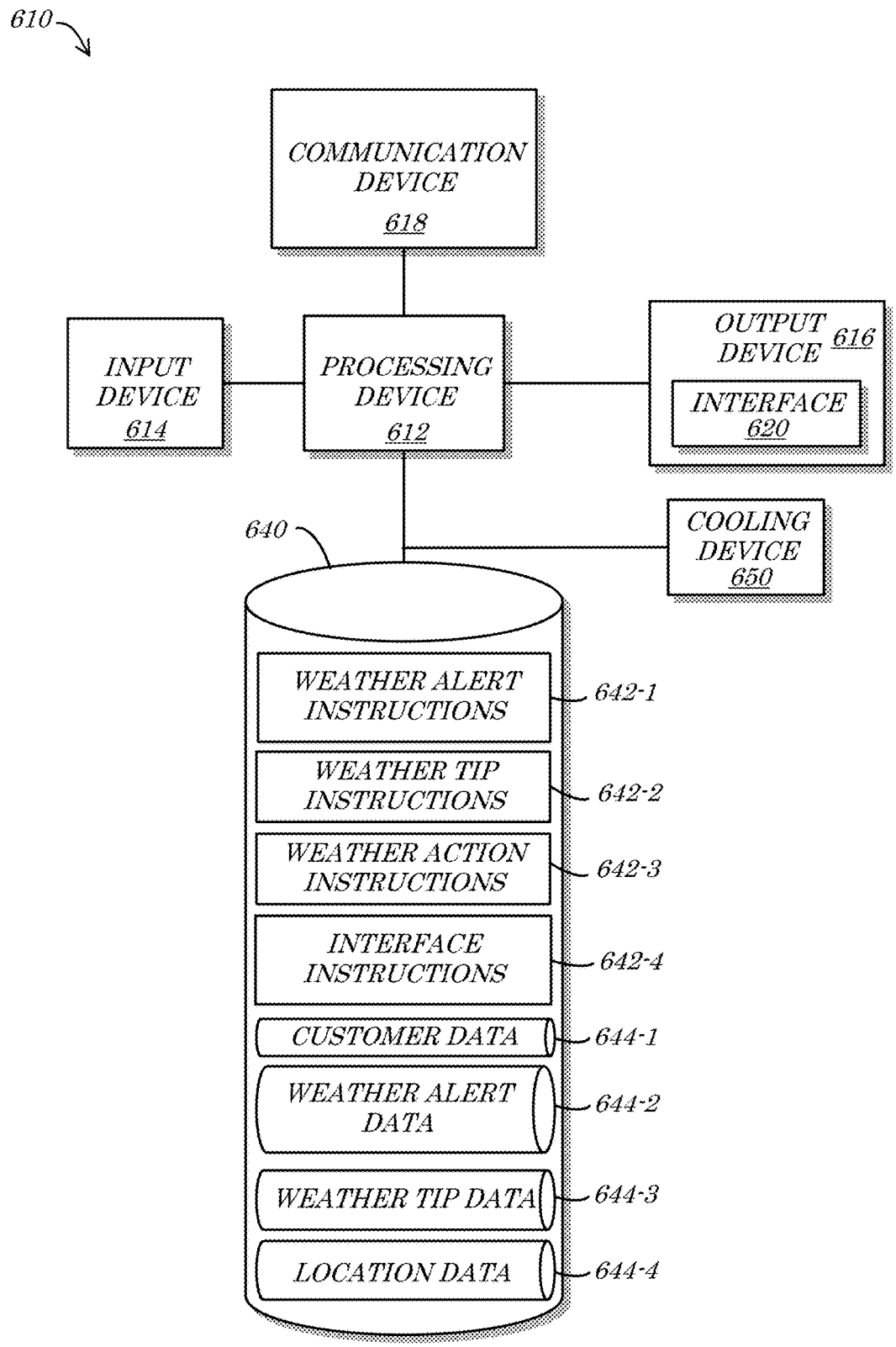
FIG. 6 is a block diagram of an apparatus according to some embodiments.
Figure 7A:
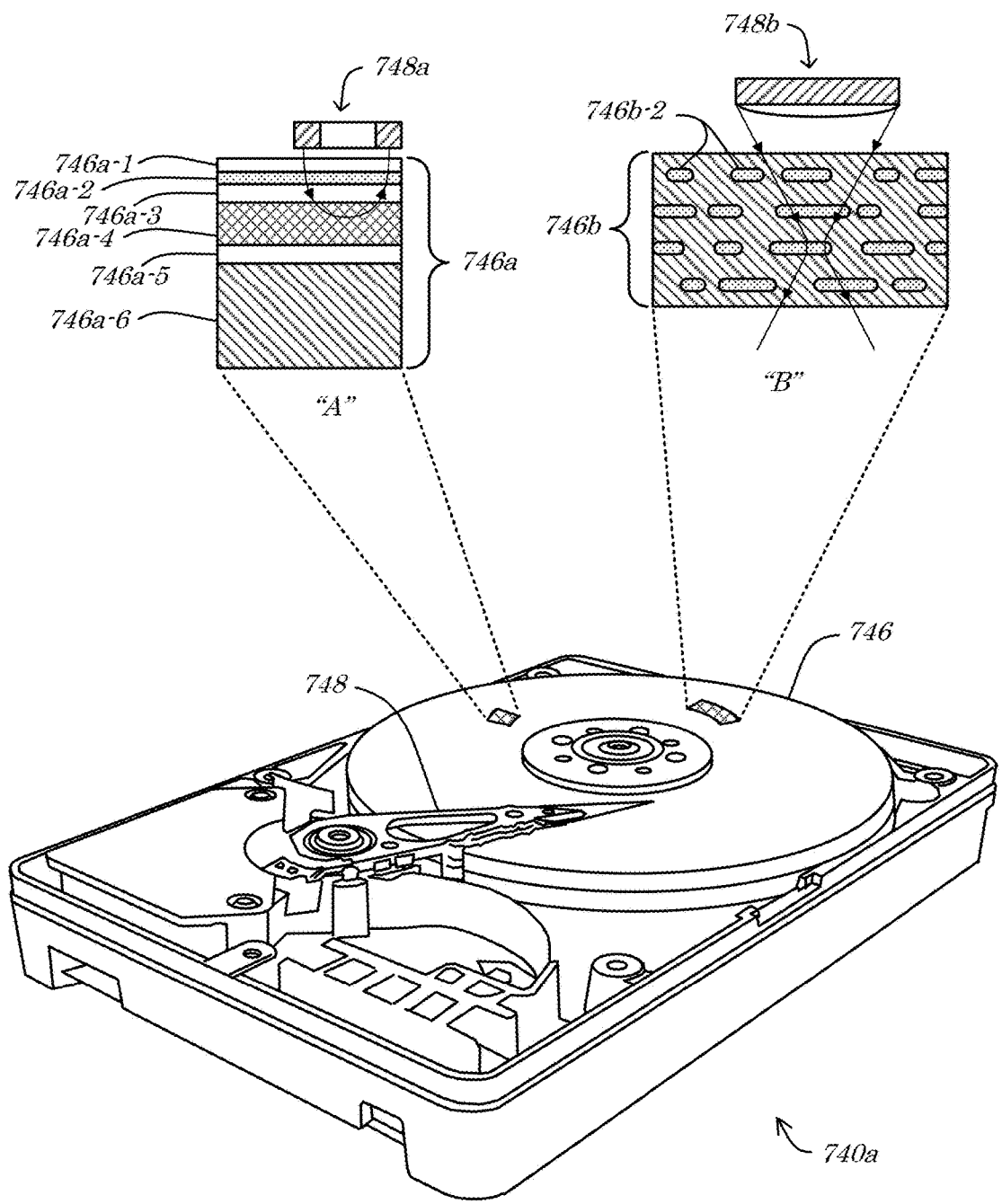
FIG. 7A, FIG. 7B, FIG. 7C, FIG. 7D, and FIG. 7E are perspective diagrams of exemplary data storage devices according to some embodiments.
Figure 7B:
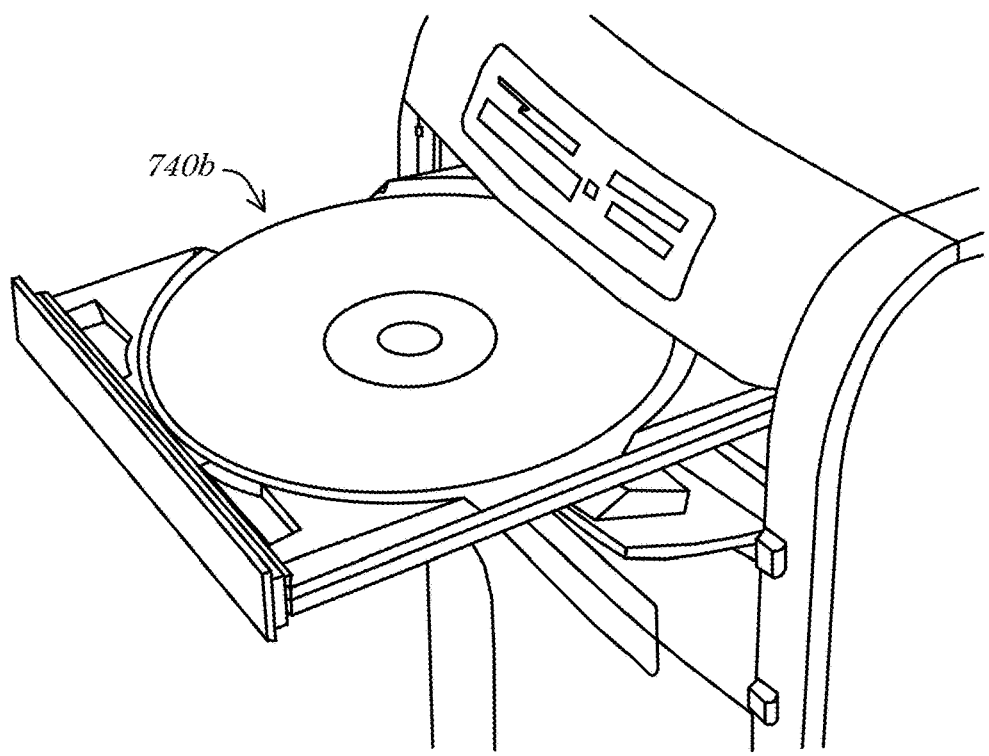
Figure 7C:
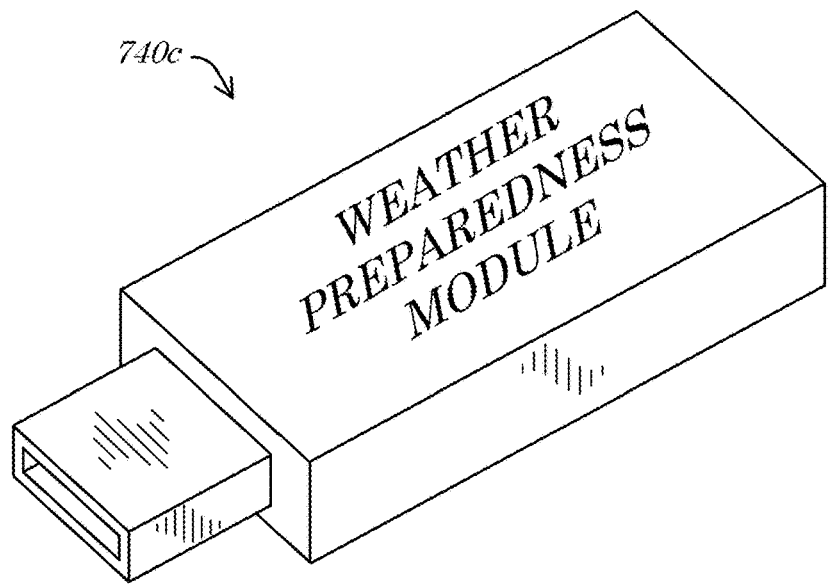
Figure 7D:
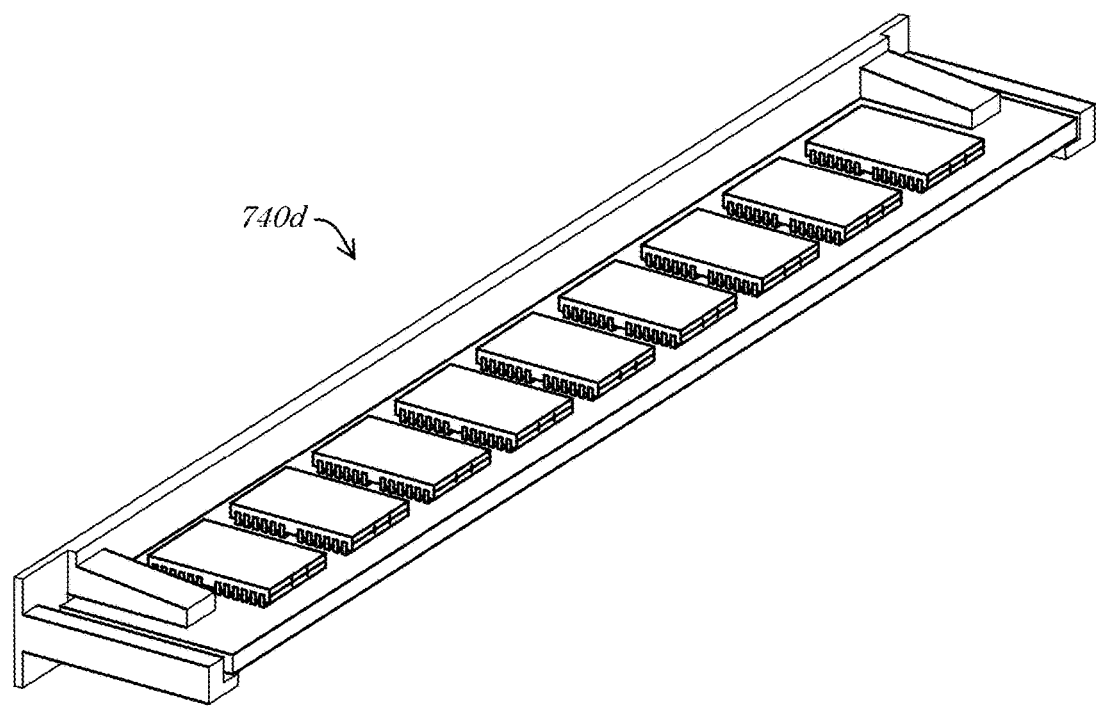
Figure 7E:
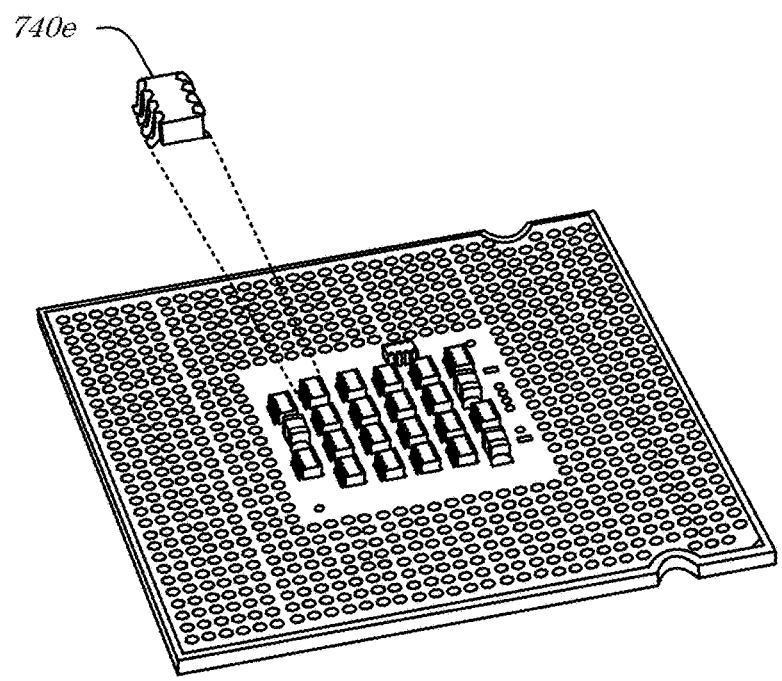

Turning to FIG. 6, a block diagram of an apparatus 610 according to some embodiments is shown. In some embodiments, the apparatus 610 may be similar in configuration and/or functionality to any of the controller device 110, the user devices 102a-n, and/or the third-party device 106, all of FIG. 1 herein and/or the mobile electronic device 202 of FIG. 2. The apparatus 610 may, for example, execute, process, facilitate, and/or otherwise be associated with the method 400 of FIG. 4 herein, and/or portions thereof. In some embodiments, the apparatus 610 may comprise a processing device 612, an input device 614, an output device 616, a communication device 618, an interface 620, a memory device 640 (storing various programs and/or instructions 642 and data 644), and/or a cooling device 650. According to some embodiments, any or all of the components 612, 614, 616, 618, 620, 640, 642, 644, 650 of the apparatus 610 may be similar in configuration and/or functionality to any similarly named and/or numbered components described herein. Fewer or more components 612, 614, 616, 618, 620, 640, 642, 644, 650 and/or various configurations of the components 612, 614, 616, 618, 620, 640, 642, 644, 650 be included in the apparatus 610 without deviating from the scope of embodiments described herein.

According to some embodiments, the processor 612 may be or include any type, quantity, and/or configuration of processor that is or becomes known. The processor 612 may comprise, for example, an Intel® IXP 2800 network processor or an Intel® XEON™ Processor coupled with an Intel® E7501 chipset. In some embodiments, the processor 612 may comprise multiple inter-connected processors, microprocessors, and/or micro-engines. According to some embodiments, the processor 612 (and/or the apparatus 610 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 610 comprises a server such as a blade server, necessary power may be supplied via a standard AC outlet, power strip, surge protector, and/or Uninterruptible Power Supply (UPS) device.

In some embodiments, the input device 614 and/or the output device 616 are communicatively coupled to the processor 612 (e.g., via wired and/or wireless connections and/or pathways) and they may generally comprise any types or configurations of input and output components and/or devices that are or become known, respectively. The input device 614 may comprise, for example, a keyboard that allows an operator of the apparatus 610 to interface with the apparatus 610 (e.g., by a user such as to receive multi-location and/or dynamic-location weather alerts and/or customized weather tips and/or preparedness action suggestions, as described herein). In some embodiments, the input device 614 may comprise a sensor configured to provide information such as user and/or user device location, to the apparatus 610 and/or the processor 612. The output device 616 may, according to some embodiments, comprise a display screen and/or other practicable output component and/or device. The output device 616 may, for example, provide an interface (such as the interface 620 and/or the interface 220 of FIG. 2 herein) via which customized weather tips, alerts, and/or suggested preparedness actions are provided to a user (e.g., via a website). According to some embodiments, the input device 614 and/or the output device 616 may comprise and/or be embodied in a single device such as a touch-screen monitor.

In some embodiments, the communication device 618 may comprise any type or configuration of communication device that is or becomes known or practicable. The communication device 618 may, for example, comprise a Network Interface Card (NIC), a telephonic device, a cellular network device, a router, a hub, a modem, and/or a communications port or cable. In some embodiments, the communication device 618 may be coupled to provide data to a client device, such as in the case that the apparatus 610 is utilized to define and/or identify weather alerts, weather tips, and/or weather action suggestions to send to a user. The communication device 618 may, for example, comprise a cellular telephone network transmission device that sends signals indicative of weather alerts, tips, and/or actions to a remote device (e.g., a user device). According to some embodiments, the communication device 618 may also or alternatively be coupled to the processor 612. In some embodiments, the communication device 618 may comprise an IR, RF, Bluetooth™, Near-Field Communication (NFC), and/or Wi-Fi® network device coupled to facilitate communications between the processor 612 and another device (such as a client device and/or a third-party device, not shown in FIG. 6).

The memory device 640 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of weather alert instructions 642-1, weather tip instructions 642-2, weather action instructions 642-3, interface instructions 642-4, customer data 644-1, weather alert data 644-2, weather tip data 644-3, and/or location data 644-4. In some embodiments, the weather alert instructions 642-1, weather tip instructions 642-2, weather action instructions 642-3, interface instructions 642-4 may be utilized by the processor 612 to provide output information via the output device 616 and/or the communication device 618.

According to some embodiments, the weather alert instructions 642-1 may be operable to cause the processor 612 to process the customer data 644-1, weather alert data 644-2, weather tip data 644-3, and/or location data 644-4 in accordance with embodiments as described herein. Customer data 644-1, weather alert data 644-2, weather tip data 644-3, and/or location data 644-4 received via the input device 614 and/or the communication device 618 may, for example, be analyzed, sorted, filtered, decoded, decompressed, ranked, scored, plotted, and/or otherwise processed by the processor 612 in accordance with the weather alert instructions 642-1. In some embodiments, customer data 644-1, weather alert data 644-2, weather tip data 644-3, and/or location data 644-4 may be fed by the processor 612 through one or more mathematical and/or statistical formulas and/or models in accordance with the weather alert instructions 642-1 to identify and/or select one or more active weather alerts to provide to a user in accordance with an applicability of the one or more active alerts to any of a plurality of locations associated with the user, as described herein.

In some embodiments, the weather tip instructions 642-2 may be operable to cause the processor 612 to process the customer data 644-1, weather alert data 644-2, weather tip data 644-3, and/or location data 644-4 in accordance with embodiments as described herein. Customer data 644-1, weather alert data 644-2, weather tip data 644-3, and/or location data 644-4 received via the input device 614 and/or the communication device 618 may, for example, be analyzed, sorted, filtered, decoded, decompressed, ranked, scored, plotted, and/or otherwise processed by the processor 612 in accordance with the weather tip instructions 642-2. In some embodiments, customer data 644-1, weather alert data 644-2, weather tip data 644-3, and/or location data 644-4 may be fed by the processor 612 through one or more mathematical and/or statistical formulas and/or models in accordance with the weather tip instructions 642-2 to identify and/or select one or more weather tips to provide to a user in accordance with an applicability of the one or more tips to any of a plurality of locations and/or objects associated with the user, as described herein.

According to some embodiments, the weather action instructions 642-3 may be operable to cause the processor 612 to process the customer data 644-1, weather alert data 644-2, weather tip data 644-3, and/or location data 644-4 in accordance with embodiments as described herein. Customer data 644-1, weather alert data 644-2, weather tip data 644-3, and/or location data 644-4 received via the input device 614 and/or the communication device 618 may, for example, be analyzed, sorted, filtered, decoded, decompressed, ranked, scored, plotted, and/or otherwise processed by the processor 612 in accordance with the weather action instructions 642-3. In some embodiments, customer data 644-1, weather alert data 644-2, weather tip data 644-3, and/or location data 644-4 may be fed by the processor 612 through one or more mathematical and/or statistical formulas and/or models in accordance with the weather action instructions 642-3 to identify and/or select one or more weather preparedness and/or loss mitigation actions or steps to provide to a user in accordance with an applicability of the one or more actions/steps to any of a plurality of locations and/or objects associated with the user, as described herein.

In some embodiments, the interface instructions 642-4 may be operable to cause the processor 612 to process the customer data 644-1, weather alert data 644-2, weather tip data 644-3, and/or location data 644-4 in accordance with embodiments as described herein. Customer data 644-1, weather alert data 644-2, weather tip data 644-3, and/or location data 644-4 received via the input device 614 and/or the communication device 618 may, for example, be analyzed, sorted, filtered, decoded, decompressed, ranked, scored, plotted, and/or otherwise processed by the processor 612 in accordance with the interface instructions 642-4. In some embodiments, customer data 644-1, weather alert data 644-2, weather tip data 644-3, and/or location data 644-4 may be fed by the processor 612 through one or more mathematical and/or statistical formulas and/or models in accordance with the interface instructions 642-4 to provide an interface (such as the interface 620 and/or the interface 220 of FIG. 2 herein) via which input and/or output descriptive of multi-location weather alerts, dynamic-location weather alerts, customized weather tips, customized weather actions, and/or weather action completion facilitation is provided, as described herein According to some embodiments, the apparatus 610 may comprise the cooling device 650. According to some embodiments, the cooling device 650 may be coupled (physically, thermally, and/or electrically) to the processor 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 610.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated).

Referring to FIG. 7A, FIG. 7B, FIG. 7C, FIG. 7D, and FIG. 7E, perspective diagrams of exemplary data storage devices 740a-e according to some embodiments are shown. The data storage devices 740a-e may, for example, be utilized to store instructions and/or data such as the weather alert instructions 642-1, weather tip instructions 642-2, weather action instructions 642-3, interface instructions 642-4, customer data 644-1, weather alert data 644-2, weather tip data 644-3, and/or location data 644-4, each of which is presented in reference to FIG. 6 herein. In some embodiments, instructions stored on the data storage devices 740a-e may, when executed by a processor, cause the implementation of and/or facilitate the method 400 of FIG. 4 herein, and/or portions thereof.

According to some embodiments, the first data storage device 740a may comprise one or more various types of internal and/or external hard drives. The first data storage device 740a may, for example, comprise a data storage medium 746 that is read, interrogated, and/or otherwise communicatively coupled to and/or via a disk reading device 748. In some embodiments, the first data storage device 740a and/or the data storage medium 746 may be configured to store information utilizing one or more magnetic, inductive, and/or optical means (e.g., magnetic, inductive, and/or optical-encoding). The data storage medium 746, depicted as a first data storage medium 746a for example (e.g., breakout cross-section "A"), may comprise one or more of a polymer layer 746a-1, a magnetic data storage layer 746a-2, a non-magnetic layer 746a-3, a magnetic base layer 746a-4, a contact layer 746a-5, and/or a substrate layer 746a-6. According to some embodiments, a magnetic read head 748a may be coupled and/or disposed to read data from the magnetic data storage layer 746a-2.

In some embodiments, the data storage medium 746, depicted as a second data storage medium 746b for example (e.g., breakout cross-section "B"), may comprise a plurality of data points 746b-2 disposed with the second data storage medium 746b. The data points 746b-2 may, in some embodiments, be read and/or otherwise interfaced with via a laser-enabled read head 748b disposed and/or coupled to direct a laser beam through the second data storage medium 746b.

In some embodiments, the second data storage device 740b may comprise a CD, CD-ROM, DVD, Blu-Ray™ Disc, and/or other type of optically-encoded disk and/or other storage medium that is or becomes know or practicable. In some embodiments, the third data storage device 740c may comprise a USB keyfob, dongle, and/or other type of flash memory data storage device that is or becomes know or practicable. In some embodiments, the fourth data storage device 740*d* may comprise RAM of any type, quantity, and/or configuration that is or becomes practicable and/or desirable. In some embodiments, the fourth data storage device 740*d* may comprise an off-chip cache such as a Level 2 (L2) cache memory device. According to some embodiments, the fifth data storage device 740*e* may comprise an on-chip memory device such as a Level 1 (L1) cache memory device.

The data storage devices 740*a-e* may generally store program instructions, code, and/or modules that, when executed by a processing device cause a particular machine to function in accordance with one or more embodiments described herein. The data storage devices 740*a-e* depicted in FIG. 7A, FIG. 7B, FIG. 7C, FIG. 7D, and FIG. 7E are representative of a class and/or subset of computer-readable media that are defined herein as "computer-readable memory" (e.g., non-transitory memory devices as opposed to transmission devices or media).

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

In some embodiments, a method may comprise (i) receiving (e.g., by a processing device) an indication of a current location of a mobile device of a user, (ii) determining (e.g., by the processing device), utilizing the current location of the mobile device of the user, an active weather alert for the current location of the mobile device of the user, the active weather alert comprising an alert of a particular weather alert type, (iii) transmitting (e.g., by the processing device and/or to the mobile device of the user) an indication of the active weather alert for the current location of the mobile device of the user, (iv) determining (e.g., by the processing device), based on the particular weather alert type of the active weather alert, a weather preparedness tip, (v) determining (e.g., by the processing device), based on an identifier of the user, and based on the weather preparedness tip, a specific weather event preparation action for the user, and (vi) transmitting (e.g., by the processing device and to the mobile device of the user), an indication of the specific weather event preparation action determined for the user.

According to some embodiments, the method may comprise (1) determining (e.g., by the processing device), that the user requires assistance to accomplish the specific weather event preparation action determined for the user, (2) selecting (e.g., by the processing device), a method of providing assistance to the user, and (3) transmitting (e.g., by the processing device and to the mobile device of the user), an indication of the method of assistance. In some embodiments, the method may further comprise providing (e.g., by the processing device and in accordance with the selected method), the assistance to the user. In some embodiments, the providing of the assistance may comprise at least one of: (i) actuating an automatic device associated with the user; and (ii) scheduling a third-party to provide assistance to the user.

In some embodiments, the method may comprise (1) prompting (e.g., by the processing device), the user to capture images of the current location of the mobile device of the user, and (2) receiving (e.g., by the processing device and in response to the prompting), data comprising one or more images captured by the mobile device of the user of the current location of the mobile device of the user. According to some embodiments, the method may further comprise (a) determining (e.g., by the processing device and based on the data comprising the one or more images captured by the mobile device), that the user has completed the specific weather event preparation action determined for the user, and (b) providing (e.g., by the processing device and in response to the determining that the user has completed the specific weather event preparation action determined for the user), an incentive to the user. In some embodiments, the incentive may comprise at least one of an insurance premium discount, a lower insurance deductible, and an increase in insurance coverage. According to some embodiments, the method may further comprise (1) receiving (e.g., by the processing device and after the receiving of the data comprising the one or more images captured by the mobile device), an indication of an insurance claim made by the user, and (2) determining (e.g., by the processing device and based on the data defining the one or more images captured by the mobile device of the user at the current location of the mobile device of the user), a validity of the insurance claim.

According to some embodiments, the method may comprise receiving (e.g., by the processing device and from the mobile device of the user), an indication of the identifier of the user. In some embodiments, the indication of the identifier of the user may comprise an insurance account identifier.

According to some embodiments, the indication of the current location of the mobile device of the user may be received from the mobile device.

According to some embodiments, the determining of the specific weather event preparation action for the user may comprise (1) querying (e.g., utilizing the identifier of the user), a database of insurance data for the user, (2) determining (e.g., based on the querying), an insured object that requires protection from a weather-related peril associated with the particular weather alert type of the active weather alert, and (3) determining (e.g., based on the particular weather alert type of the active weather alert), the specific weather event preparation action for the user. According to some embodiments, the transmitting of the indication of the specific weather event preparation action for the user may comprise transmitting instructions describing how to protect the insured object from the weather-related peril. According to some embodiments, the method may further comprise verifying (e.g., after the transmitting of the indication of the specific weather event preparation action for the user), that the user has complied with the instructions describing how to protect the insured object from the weather-related peril.

What is claimed is:

1. A system for automatically selecting and actuating a first remote physical object at a first one of a plurality of locations associated with an insurance customer, in response to weather event alert data for the first one of the locations, comprising:

a remotely-controllable electro-mechanical physical object disposed at a first location associated with a first insurance policy and a first insured object associated with the insurance customer, wherein the remotely-controllable electro-mechanical physical object comprises at least one of a hurricane shutter, a door, a hatch, a lock, a latch, a relay, a solenoid, and a lift; and a centralized controller device in communication with the remotely-controllable electro-mechanical physical object, the centralized controller comprising a processing device, a communication device, and a data storage device storing (i) insured object status data, (ii) insured object location data, and (iii) weather action instructions, wherein execution of the weather action instructions by the processing device results in:

receiving, via the communication device, a broadcast of a weather alert indicating a weather alert type and a weather alert location;

identifying, by the processing device and based on the stored insured object location data, the received weather alert type, and the received weather alert location, an applicable weather alert preparedness action for the first insured object;

identifying, by the processing device and based on the stored insured object status data, that the remotely-controllable electro-mechanical physical object should be actuated;

transmitting, by the communication device and to the remotely-controllable electro-mechanical physical object, a command signal that causes the remotely-controllable electro-mechanical physical object to actuate; and updating, by the processing device, the stored insured object status data to reflect the actuation of the remotely-controllable electro-mechanical physical object.

2. The system of claim 1, wherein the remotely-controllable electro-mechanical physical object comprises a first remotely-controllable electro-mechanical physical object, the system further comprising:
a second remotely-controllable electro-mechanical physical object disposed at a second location associated with a second insurance policy and a second insured object associated with the insurance customer.

3. The system of claim 2, wherein the execution of the weather action instructions by the processing device further results in:
identifying, by comparing the received weather alert location to stored indications of the plurality of locations associated with the insurance customer, that the weather alert applies to the first location.

4. The system of claim 3, wherein the insured object location data comprises the stored indications of the plurality of locations associated with the insurance customer.

5. The system of claim 3, wherein the weather alert comprises a first weather alert, the weather alert type comprises a first weather alert type, the weather alert location comprises a first weather alert location, and wherein the execution of the weather action instructions by the processing device further results in:
receiving, via the communication device, a broadcast of a second weather alert indicating a second weather alert type and second weather alert location.

6. The system of claim 5, wherein the execution of the weather action instructions by the processing device further results in:
identifying, by comparing the received second weather alert location to the stored indications of the plurality of locations associated with the insurance customer, that the second weather alert applies to the second location.

7. The system of claim 6, wherein the execution of the weather action instructions by the processing device further results in:
identifying, by the processing device and based on the stored insured object location data, the received second weather alert type, and the received second weather alert location, an applicable weather alert preparedness action for the second insured object;
identifying, by the processing device and based on the stored insured object status data, that the second remotely-controllable electro-mechanical physical object should be actuated;
transmitting, by the communication device and to the second remotely-controllable electro-mechanical physical object, a command signal that causes the second remotely-controllable electro-mechanical physical object to actuate; and
updating, by the processing device, the stored insured object status data to reflect the actuation of the second remotely-controllable electro-mechanical physical object.

8. The system of claim 1, wherein the execution of the weather action instructions by the processing device further results in:
prompting, by the processing device and via a touch sensitive input/output device, the insurance customer to capture images of the first location; and
receiving, by the processing device and in response to the prompting, data comprising one or more images captured of the first location.

9. The system of claim 8, wherein the execution of the weather action instructions by the processing device further results in:
verifying, by the processing device and based on the data comprising the one or more images, the stored insured object status data reflecting the actuation of the remotely-controllable electro-mechanical physical object; and
providing, by the processing device and in response to the verifying of the stored insured object status data reflecting the actuation of the remotely-controllable electro-mechanical physical object, an incentive to the insurance customer.

10. The system of claim 9, wherein the incentive comprises at least one of an insurance premium discount, a lower insurance deductible, and an increase in insurance coverage.

11. The system of claim 8, wherein the execution of the weather action instructions by the processing device further results in:
receiving, by the processing device and after the receiving of the data comprising the one or more images, an indication of an insurance claim by the insurance customer; and
determining, by the processing device and based on the data comprising the one or more images, a validity of the insurance claim.

12. The system of claim 1, wherein the identifying of the applicable weather alert preparedness action for the first insured object, comprises:
querying, utilizing an identifier of the first location, a database of insurance data for a plurality of insurance policy locations;
identifying, based on the querying, that a type of insured object assigned to the first insured object requires protection from a weather-related peril associated with the particular weather alert type of the active weather alert; and
determining, based on the particular weather alert type of the active weather alert, the specific weather event preparation action for the first location.

13. A system for automatically selecting and moving a first remote physical object at a first one of a plurality of locations associated with an insurance customer, in response to weather event alert data for the first one of the locations, comprising:
a remotely-controllable electro-mechanical physical object disposed at a first location associated with a first insurance policy and a first insured object associated with the insurance customer, the remotely-controllable electro-mechanical physical object being operable to move between a first position and a second position, and wherein the remotely-controllable electro-mechanical physical object comprises at least one of a hurricane shutter, a door, a hatch, a lock, a latch, a relay, a solenoid, and a lift; and
a centralized controller device in communication with the remotely-controllable electro-mechanical physical object, the centralized controller comprising a processing device, a communication device, and a data storage device storing (i) insured object status data identifying a current position of the remotely-controllable electro-mechanical physical object, (ii) insured object location data, and (iii) weather action instructions, wherein execution of the weather action instructions by the processing device results in:
receiving, via the communication device, a broadcast of a weather alert indicating a weather alert type and a weather alert location;
identifying, by the processing device and based on the stored insured object location data, the received weather alert type, and the received weather alert location, an applicable weather alert preparedness action for the first insured object;

identifying, by the processing device and based on the stored insured object status data, that the remotely-controllable electro-mechanical physical object should be moved from the current position to at least one of the first position and the second position;

transmitting, by the communication device and to the remotely-controllable electro-mechanical physical object, a command signal that causes the remotely-controllable electro-mechanical physical object to move to the at least one of the first position and the second position; and updating, by the processing device, the stored insured object status data to reflect the movement of the remotely-controllable electro-mechanical physical object to the at least one of the first position and the second position.

14. The system of claim 13, wherein the at least one of the first position and the second position comprise, respectively, at least one of: open and closed positions, unlocked and locked positions, and in water and out of water positions.

* * * * *